(12) United States Patent
Shiraishi

(10) Patent No.: US 7,519,746 B2
(45) Date of Patent: Apr. 14, 2009

(54) ELASTIC BUFFER

(75) Inventor: Mikio Shiraishi, Yokohama (JP)

(73) Assignee: Kabushiki Kaisha Toshiba (JP)

( * ) Notice: Subject to any disclaimer, the term of this patent is extended or adjusted under 35 U.S.C. 154(b) by 348 days.

(21) Appl. No.: 11/210,134

(22) Filed: Aug. 22, 2005

(65) Prior Publication Data

US 2006/0075162 A1 Apr. 6, 2006

(30) Foreign Application Priority Data

Aug. 25, 2004 (JP) ............... 2004-245440

(51) Int. Cl.
*G06F 3/00* (2006.01)
(52) U.S. Cl. ............... 710/52; 710/56; 710/57
(58) Field of Classification Search ............... 710/52
See application file for complete search history.

(56) References Cited

U.S. PATENT DOCUMENTS

| | | | |
|---|---|---|---|
| 3,421,147 A | 1/1969 | Burton et al. | |
| 4,692,894 A | 9/1987 | Bemis | |
| 4,945,548 A | 7/1990 | Iannarone et al. | |
| 6,408,409 B1 * | 6/2002 | Williams et al. | 714/719 |
| 6,766,464 B2 * | 7/2004 | Collier | 713/503 |
| 6,977,897 B1 * | 12/2005 | Nelson et al. | 370/235 |
| 7,218,670 B1 * | 5/2007 | Lesea et al. | 375/226 |
| 2002/0041650 A1 * | 4/2002 | Richmond | 375/372 |
| 2004/0170196 A1 * | 9/2004 | Susnow | 370/503 |
| 2005/0005051 A1 * | 1/2005 | Tseng | 710/310 |
| 2006/0088061 A1 * | 4/2006 | Roberts | 370/474 |

FOREIGN PATENT DOCUMENTS

JP 07-38543 7/1995

* cited by examiner

*Primary Examiner*—Niketa Patel
(74) *Attorney, Agent, or Firm*—DLA Piper LLP (US)

(57) ABSTRACT

An output of a first ring counter is held in a first storage circuit. Outputs of a second ring counter and the first storage circuit are input to a first AND circuit group. An output of a third ring counter and an output of the first storage circuit are input to a second AND circuit group. Outputs of the first AND circuit group are input to a first OR circuit. Outputs of the second AND circuit group are input to a second OR circuit. An output of the first OR circuit is stored in a second storage circuit. An output of the second OR circuit is stored in a third storage circuit. Outputs of the first and second OR circuits and outputs of the second and third storage circuits are supplied to a decode circuit, and are decoded to output an overflow signal and an underflow signal.

20 Claims, 16 Drawing Sheets

ELASTIC BUFFER

CROSS-REFERENCE TO RELATED APPLICATIONS

This application is based upon and claims the benefit of priority from prior Japanese Patent Application No. 2004-245440, filed Aug. 25, 2004, the entire contents of which are incorporated herein by reference.

BACKGROUND OF THE INVENTION

1. Field of the Invention

The present invention relates to an elastic buffer, and in particular, to a detection circuit which detects an overflow state and an underflow state of data in an elastic buffer.

2. Description of the Related Art

In a case of delivering of time series data between digital circuits on a transmission side and a reception side whose clock signals are different, a special device is required. For example, a flip-flop is utilized in a communication method called a handshake. The flip-flop is set by the circuit on the transmission side, and reset by the circuit on the reception side. A signal stored in the flip-flop is generally called a flag. On the reception side, a buffer having a storage capacity of one word is prepared. The buffer operates so as to synchronize a clock signal used on the transmission side. At a point in time when the transmission of the data of one word is completed, the flag is set by the transmission side. When the flag is detected on the reception side, the data is read from the buffer so as to synchronize a clock signal used on the reception side. After reading the data, the flag is reset.

In this method, data communication can be asynchronously carried out, but it takes time to set and reset the flag in addition to the data transfer. Further, a dedicated communication line is necessary for setting the flag.

When the frequencies of the clock signals used on the transmission side and the reception side are sufficiently close to each other, it is possible to connect the transmitting and receiving circuits by an elastic buffer. When an elastic buffer is used, it is possible to deliver time series data without being disconnected during a certain period. There is disclosed an elastic buffer in, for example, U.S. patent application Ser. No. 3,868,481. Further, although the term "elastic buffer" is not used, there are disclosed basic configurations thereof in U.S. patent application Ser. No. 3,421,147, and in Jpn. Pat. Appln. KOKAI Publication No. 07-038543.

The circuit disclosed in Jpn. Pat. Appln. KOKAI Publication No. 07-038543 has a write address counter, a read address counter, a first-in first-out (FIFO) storage circuit, and a comparison circuit. Input data and a write clock signal are input to the data port and the clock input port of the storage circuit. Output data is output from the data output port of the storage circuit. The write address counter generates a write address so as to synchronize the input write clock signal. The read address counter generates a read address so as to synchronize the input read clock signal. The write address and the read address are input to the storage circuit and the comparison circuit. The storage circuit writes input data into a place indicated by the write address (hereinafter, referred to as a write pointer position) so as to synchronize the write clock signal, and reads output data from a place indicated by the read address (hereinafter, referred to as a read pointer position). The comparison circuit compares the write address and the read address, and outputs an underflow signal and an overflow signal.

In order to make the circuit having such a configuration operate as the elastic buffer, first, the write address counter is operated to provide input data so as to synchronize the write clock signal. At a stage when the data are accumulated up to half of the storage capacity of the storage circuit, the read address counter is made to operate. The fact that the accumulated data has reached half of the storage capacity of the storage circuit is detected by utilizing an internal flag or the like by a control circuit, and the read address counter is notified of the fact.

Even when the phases of the write and read clock signals are not equal to each other, correct data are always delivered to a clock domain of the read clock signal from a circuit (clock domain) operated by a write clock signal if a write pointer position and a read pointer position are different from each other, and unless one overtakes the other. However, when a phase difference between the two clock signals is accumulated in a given direction of lagging or leading, the two pointers are gradually made to be close, and finally result in a coincidence or an overtaking.

When the phase difference of the write clock signal with respect to the read clock signal is accumulated in a leading direction, the write pointer position catches up with the read pointer position from the rear, which brings about destruction of unread data. This state is called an overflow. In contrast thereto, when the phase difference of the write clock signal with respect to the read clock signal is accumulated in a lagging direction, at this time, the read pointer position catches up with the write pointer position from the rear, and the data is read from a storage place which has been already read or into which writing has not been carried out. This state is called an underflow.

In the circuit disclosed in Jpn. Pat. Appln. KOKAI Publication No. 07-38543, a comparison circuit is provided in order to sense an overflow or an underflow. In this comparison circuit, two addresses are compared. However, an output of a synchronous circuit operating so as to synchronize a clock signal generally has a stationary period in which the value thereof is stable, and a transitional period in which the value is on the way of varying. Because, in the transitional period, respective bits configuring the data respectively obtain intermediate values (this is called a metastable state) between a high level (corresponding to data '1' here) and a low level (corresponding to data '0' here), a digital operated result such as a comparison in magnitudes during the transitional period or the like cannot be utilized. Accordingly, in the circuit disclosed in Jpn. Pat. Appln. KOKAI Publication No. 07-38543, the phase relationship between the write clock signal and the read clock signal must be known already, or the period in which neither varies must be determined.

BRIEF SUMMARY OF THE INVENTION

According to one aspect of the present invention, there is provided an elastic buffer for receiving to store data from a first circuit which operates to synchronize a first clock signal, and reading the data out to a second circuit which operates to synchronize a second clock signal whose phase is different from that of the first clock signal, the elastic buffer comprising: a fist storage circuit connected to the first and second circuits; and a detection circuit which receives the first and second clock signals, and detects an overflow state in which unread data has been broken or is going to be broken, and an underflow state in which already-read data or invalid data has been read or is going to be read, wherein the detection circuit has: a first ring counter in which first initial value data composed of a plurality of bits is set, the first ring counter receiving the first clock signal, and circulating the first initial value data to synchronize the first clock signal; a second ring counter in which second initial value data composed of a plurality of bits is set, the second ring counter receiving the second clock signal, and circulating the second initial value data to synchronize the second clock signal; a third ring counter in which third initial value data composed of a plurality of bits is set, the third ring counter receiving the second clock signal, and circulating the third initial value data to synchronize the second clock signal; a second storage circuit which receives an output of the first ring counter and the second clock signal, and fetches and holds the output of the first ring counter to synchronize the second clock signal; a first AND circuit group which has first and second inputs, and comprises a plurality of AND circuits which receive bits respectively corresponding to an output of the second ring counter and an output of the second storage circuit at the first and second inputs; a second AND circuit group which has third and fourth inputs, and comprises a plurality of AND circuits which receive bits respectively corresponding to an output of the third ring counter and an output of the second storage circuit at the third and fourth inputs; a first OR circuit which has a plurality of inputs, and receives outputs of the first AND circuit group at the plurality of inputs; a second OR circuit which has a plurality of inputs, and receives outputs of the second AND circuit group at the plurality of inputs; a third storage circuit which receives and stores an output of the first OR circuit; a fourth storage circuit which receives and stores an output of the second OR circuit; and a decode circuit which receives outputs of the first and second OR circuits and outputs of the third and fourth storage circuits, and decodes the outputs to output an overflow signal and an underflow signal.

DETAILED DESCRIPTION OF THE INVENTION

First, before descriptions of embodiments of the present invention, an elastic buffer in a comparison example will be described hereinafter. A write clock signal and a read clock signal are supplied to a storage circuit which is provided in the elastic buffer and stores data. When a phase relationship between the write clock signal and the read clock signal is unknown, a countermeasure as follows is applied. As one example of the case where the phase relationship is unknown, there is a case where the write clock signal is regenerated from an input data sequence due to clock data recovery (CDR). CDR is a mechanism for transferring only a data sequence in series without transmitting a clock signal, and for reproducing a clock signal from the data sequence at the reception side. In a case of using CDR in high-speed data communication, it is possible to dissolve a malfunction due to skew of a clock signal and a data signal. The regenerated clock signal is frequency-divided in units of words, and the received tandem data is converted into parallel data. In the regenerated clock signal which has been frequency-divided, a difference between the operational clock frequencies on the transmission side and the reception side, i.e., a frequency offset, and a fluctuation in a time direction of a data variation point generated in a transmission line or transmitting and receiving circuits, i.e., jitter are included. When the data made to be parallel is delivered, an elastic buffer is used. As the write clock signal of the elastic buffer, the regenerated clock signal which has been frequency-divided is used, and a clock signal which is generated at the reception side and whose cycle is stable is used as the read clock signal. At that time, the phase relationship between the write clock signal and the read clock signal is disturbed under the influence of the jitter, and the phase difference increases in a given direction of leading or lagging under the influence of the frequency offset.

Figure 1:
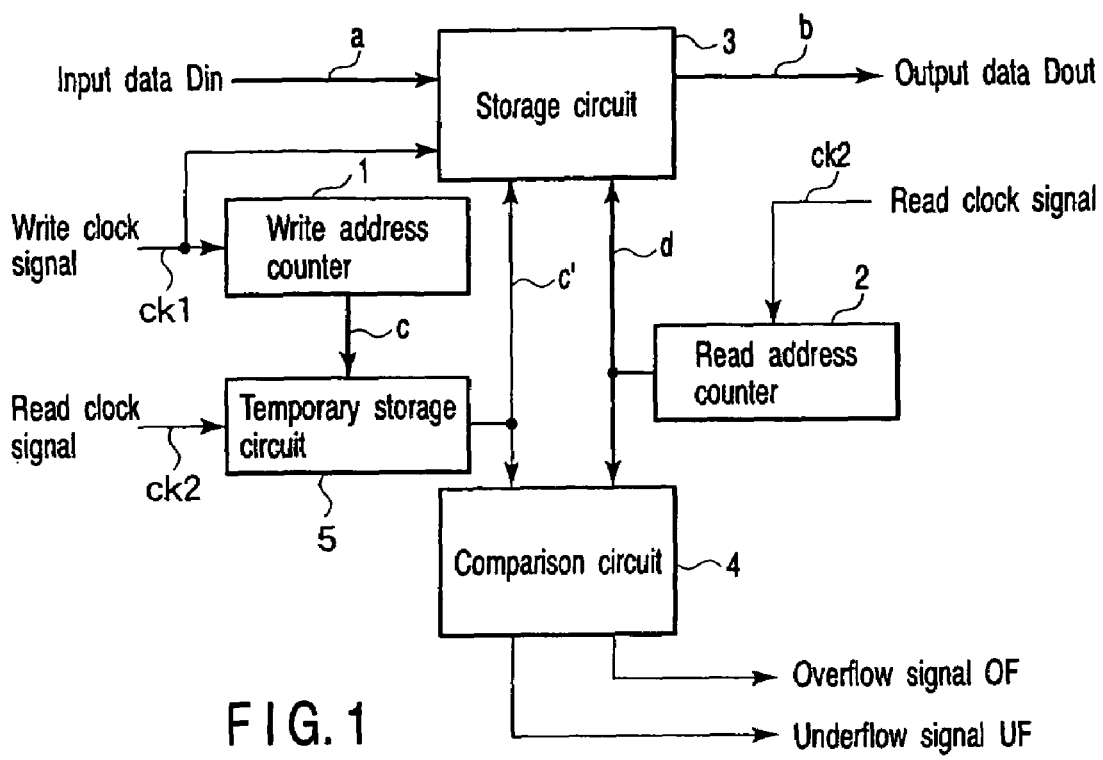
FIG. 1 is a circuit diagram of an elastic buffer according to a comparison example of the present invention to which a countermeasure against a metastable state has been applied.

FIG. 1 shows a configuration of an elastic buffer according to the comparison example of the present invention. The elastic buffer has a write address counter 1, a read address counter 2, a first-in first-out (FIFO) storage circuit 3, a comparison circuit 4, and a temporary storage circuit (temporary buffer) 5. In this example, an output of the write address counter 1 is stored in the temporary storage circuit 5, and thereafter, it is input to the comparison circuit 4. A write address c generated so as to synchronize a write clock signal ck1 by the write address counter 1 is input to the temporary storage circuit 5. The temporary storage circuit 5 fetches the write address c so as to synchronize a read clock signal ck2, and outputs it as a temporary storage address c' to the comparison circuit 4. As the temporary storage circuit 5, for example, a register is used. The register fetches input data into the inside at a rising edge of a clock signal, and outputs it. When such a register is used, a setup time and a hold time for which input data is invariable are required before and after a rise of a clock signal.

When the phase relationship between the write clock signal ck1 and the read clock signal ck2 is unknown, provided that the temporary storage address c' is input to the comparison circuit 4 in place of the write address c, an overflow signal OF and an underflow signal UF can be processed in a circuit operated on the basis of the read clock signal ck2.

However, when the leading edge of the read clock signal ck2 is close to the transitional period of the write address c, a request for a setup time and a hold time based on the leading edge of the clock signal ck2 in the temporary storage circuit 5 is not satisfied, and data in a metastable state is read.

Figure 2:
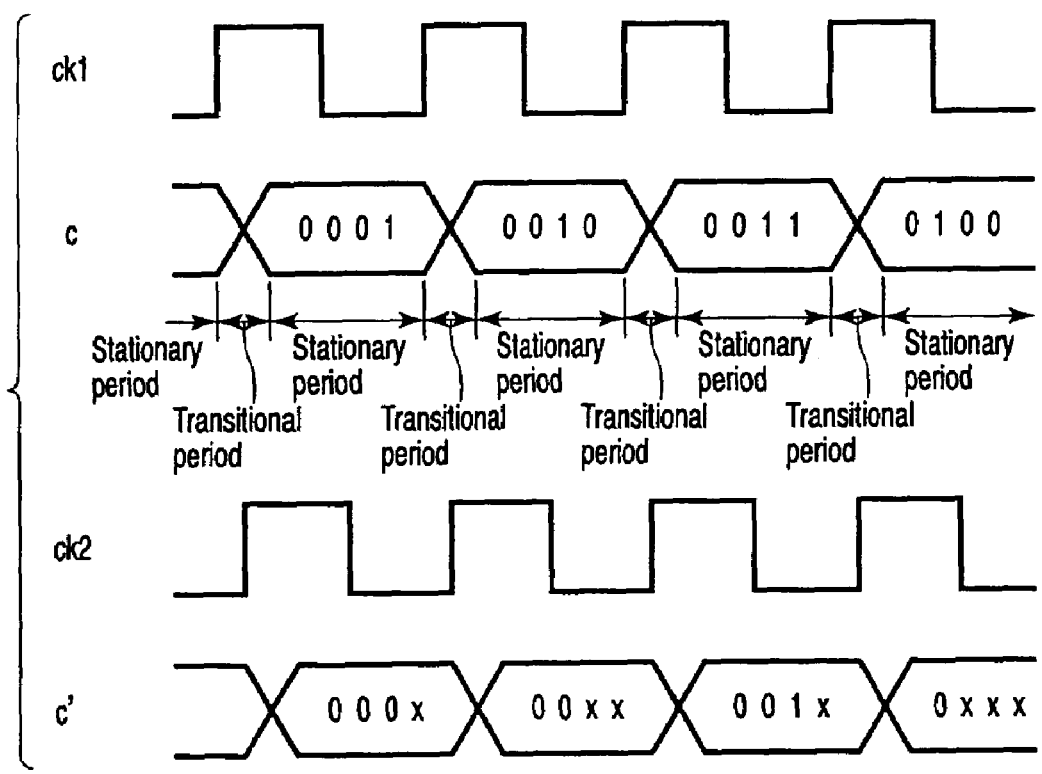
FIG. 2 is a timing chart for explanation of a metastable state generated at an input side of a temporary storage circuit for use in the elastic buffer of FIG. 1.

FIG. 2 is a diagram for explanation of a metastable state generated when binary counters are used as the address counters 1 and 2. Symbols x in binary codes denoting the addresses c and c' express indefinite bits of 1 or 0 generated by reading a metastable state. In this way, when binary counters are used, there is the possibility that all the bits are simultaneously made to be in a metastable state.

Further, in the elastic buffer disclosed in the above U.S. patent application Ser. No. 3,421,147, a ring counter is used as an address counter. The ring counter selects the one and only register in a register array used as a first-in first-out storage circuit. Accordingly, a one-hot code by which only one bit among the bits configuring the ring counter is made to be in an active state (here, suppose that it is 1) is used. In the ring counter disclosed in U.S. patent application Ser. No. 3,421,147, this one and only '1' is successively transferred so as to synchronize a clock signal.

In a case where a ring counter using a one-hot code is used as the write address counter 1 in FIG. 1, only two bits of the one and only '1' and an adjacent bit in the transfer direction are read as indefinite bits when the one-hot code is made to be in a metastable state. However, because all the other bits are '0', there is the risk that all the bits are read as '0'. Note that the elastic buffer disclosed in U.S. patent application Ser. No. 3,421,147 has no means corresponding to the temporary storage circuit 5 in FIG. 1, and it is difficult to use it when the phase relationship between the write clock signal and the read clock signal is unknown. Further, an overflow and an underflow are not distinguished from each other, and only an overlap between the pointer positions is detected.

In order to avoid a metastable state as described above when the phase relationship between the write clock signal and the read clock signal is unknown, it is necessary to design the comparison circuit 4 which can eliminate the influence of indefinite bits read in the temporary storage circuit 5 by using a code in place of a binary code or a one-hot code.

With respect to a gray code, only one bit varies before and after varying, and a range influenced by a metastable state can be limited to only one value counted by a counter. Namely, a difference generated when indefinite bits that are considered as defined values are not correct, is made to be less than or equal to a counted value 1. However, when a gray code is used, it is difficult to compare the counted values, i.e., the addresses thereof. Accordingly, a comparison is carried out after converting the gray code into a binary code, which makes the configuration of the comparison circuit complicated, and the circuit cannot be made high-speed.

Next, various embodiments of the present invention will be described. Note that, to describe the respective embodiments, portions corresponding to each other are denoted by the same reference numerals, and duplicate descriptions will be avoided.

Figure 3:
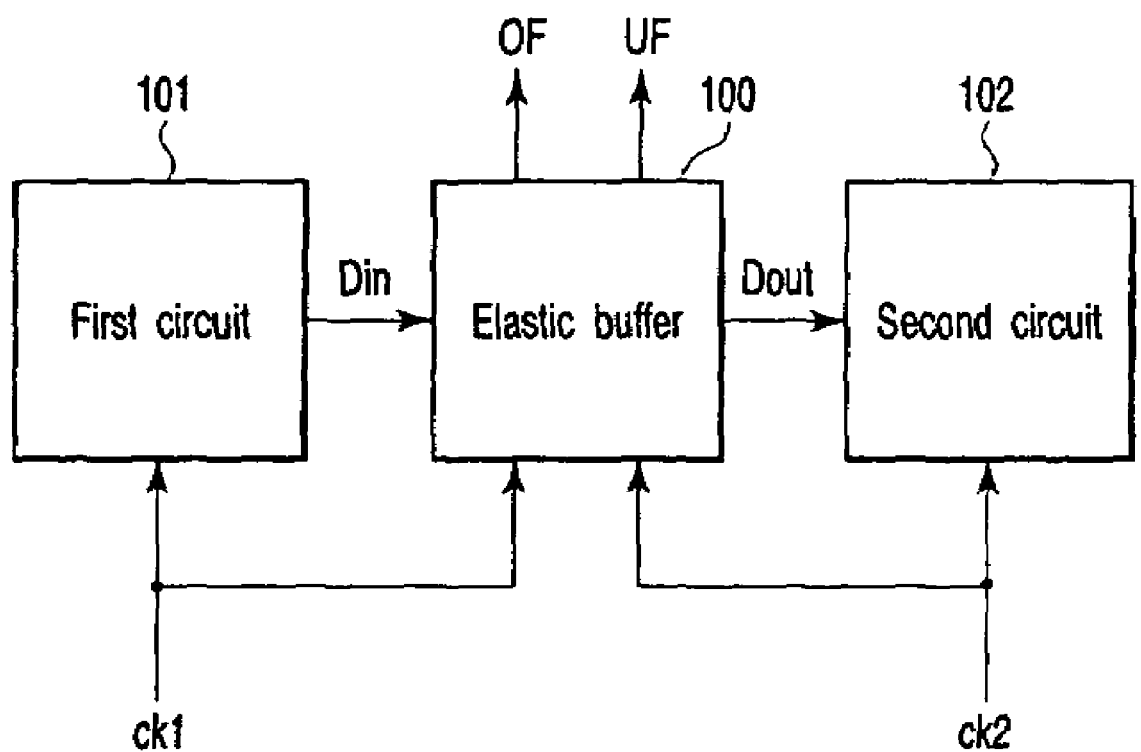
FIG. 3 is a block diagram showing an entire configuration of a data transfer circuit including the elastic buffer of the invention.

As shown in FIG. 3, an elastic buffer 100 according to the invention is provided between a first circuit 101 on a data transmission side and a second circuit 102 on a data reception side. The elastic buffer 100, the first circuit 101, and the second circuit 102 configure a data transfer circuit. The first circuit 101 operates so as to synchronize the first clock signal ck1. The second circuit 102 operates so as to synchronize the second clock signal ck2 whose phase is different from that of the first clock signal ck1. The first and second clock signals ck1 and ck2 are supplied to the elastic buffer 100. The elastic buffer 100 has a detection circuit which detects an overflow state in which unread data has been broken or is going to be broken, and an underflow state in which already-read data or invalid data has been read or is going to be read. The detection circuit outputs an overflow signal OF when an overflow state is detected, and outputs an underflow signal UF when an underflow state is detected.

First Embodiment

Figure 4:
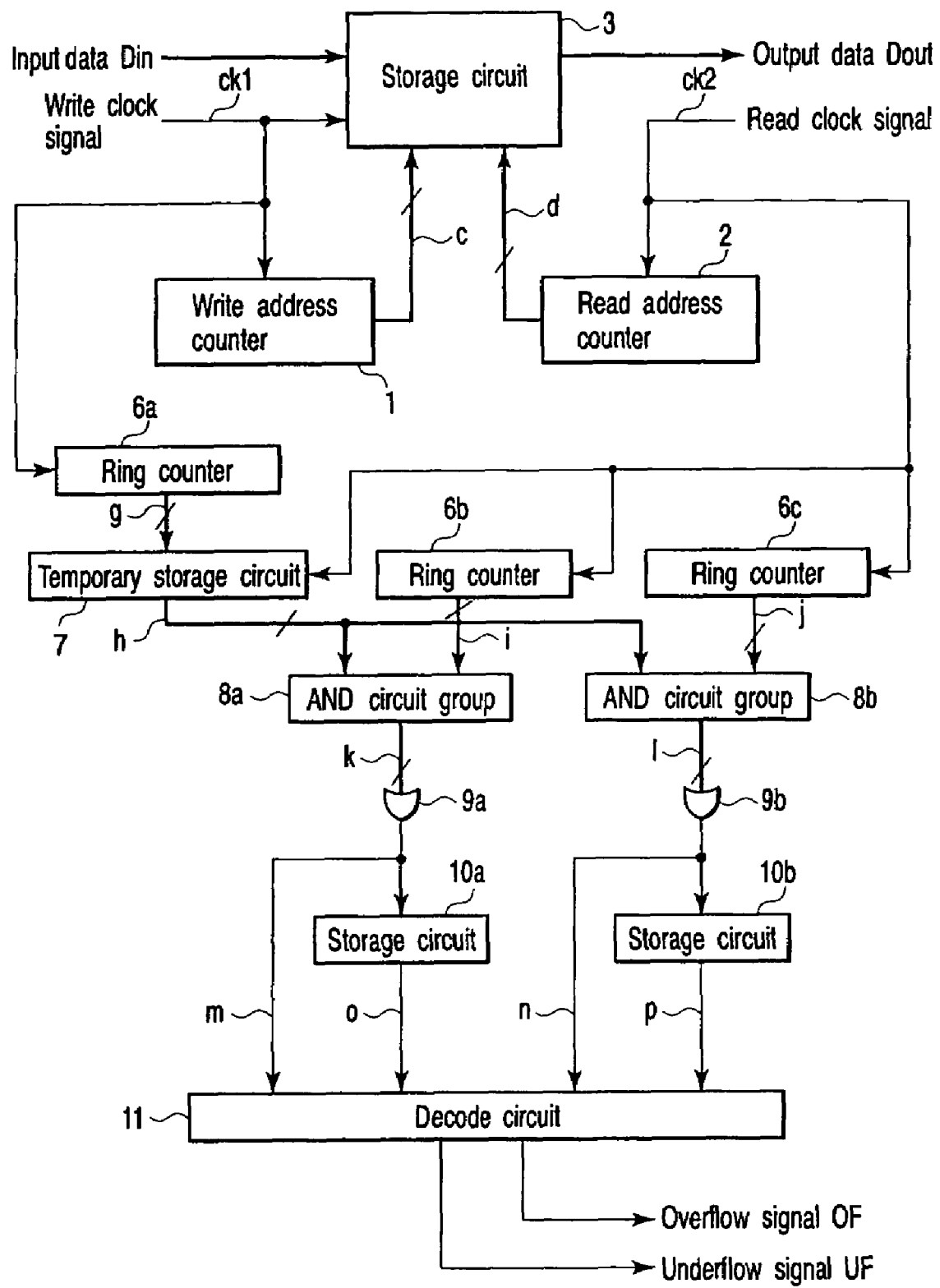
FIG. 4 is a block circuit diagram of an elastic buffer according to a first embodiment of the present invention.

FIG. 4 shows an elastic buffer according to a first embodiment of the invention. The elastic buffer has the write address counter 1, the read address counter 2, the first-in first-out (FIFO) storage circuit 3, ring counters 6a to 6c, a temporary storage circuit 7, AND circuit groups 8a and 8b which are respectively formed from a plurality of AND circuits, OR circuits 9a and 9b, storage circuits 10a and 10b, and a decode circuit 11.

Input data Din and the write clock ck1 are input to the data port and the clock input port of the storage circuit 3. Output data Dout is output from the data output port of the storage circuit 3. The write address counter 1 generates a write address c so as to synchronize the write clock signal ck1. The read address counter 2 generates a read address d so as to synchronize the read clock signal ck2. The write address c and the read address d are input to the storage circuit 3.

The storage circuit 3 writes the input data Din into a write pointer position indicated by the address c so as to synchronize the write clock signal ck1, and reads the output data Dout of a read pointer position indicated by the address d. The ring counter 6a operates so as to synchronize the write clock signal ck1, and first initial value data formed from a plurality of bits is set, and the ring counter 6a circulates and outputs the first initial value data. The ring counters 6b and 6c respectively operate so as to synchronize the read clock signal ck2, and second and third initial value data respectively formed from a plurality of bits are set in those, and the ring counters 6b and 6c circulate and output the second and third initial value data.

The temporary storage circuit 7 operates so as to synchronize the read clock signal ck2, and fetches an output g of the ring counter 6a into the inside and outputs it. The AND circuit group 8a finds a logical product (AND) of the respective bits of an output h of the temporary storage circuit 7 and an output i of the ring counter 6b, and outputs it. The AND circuit group 8b finds a logical product (AND) of the respective bits of the output h of the temporary storage circuit 7 and an output j of the ring counter 6c, and outputs it. The OR circuits 9a and 9b respectively find logical sums (OR) of all the bits of an output k and an output l of the AND circuit groups 8a and 8b, and output those.

The storage circuits 10a and 10b respectively store an output m and an output n of the OR circuits 9a and 9b. The decode circuit 11 decodes four signals, i.e., the outputs m and n of the OR circuits 9a and 9b, and outputs o and p of the storage circuits 10a and 10b, and outputs an underflow signal UF and an overflow signal OF.

Figure 5:
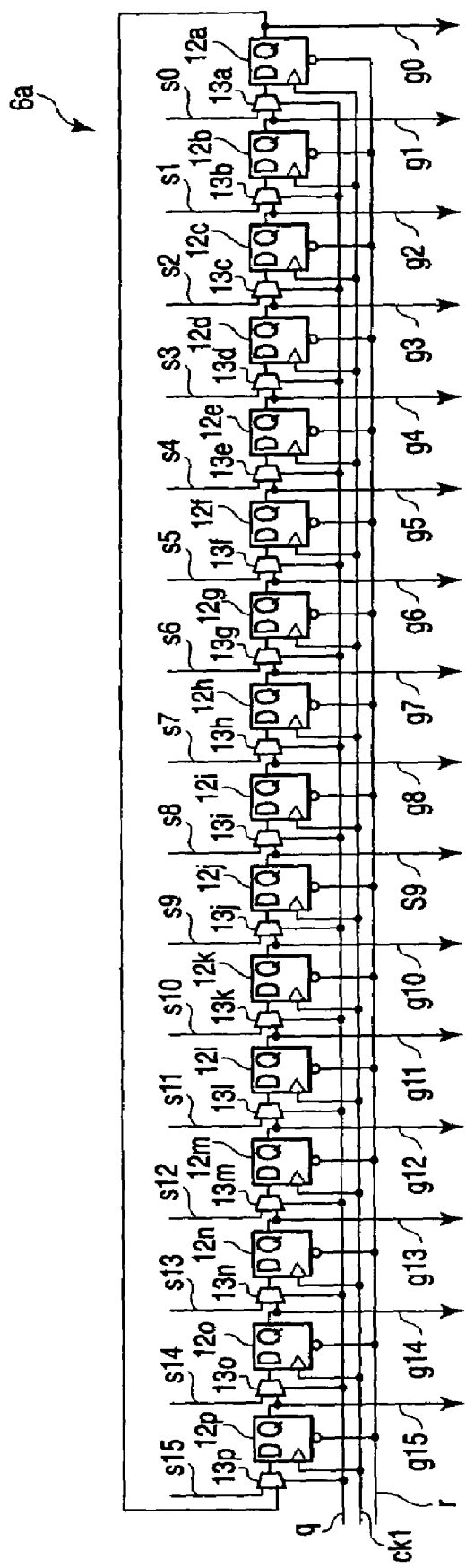
FIG. 5 is a circuit diagram showing one example of a ring counter for use in the elastic buffer in FIG. 4.

As the ring counters 6a to 6c in FIG. 4, for example, circuits as shown in FIG. 5 can be respectively used. FIG. 5 shows one example when the ring counter 6a used in the first embodiment has a 16-bit configuration. The ring counter 6a has 16 flip-flops 12a to 12p, and 16 selectors 13a to 13p which have been provided at the respective preceding stages of the 16 flip-flops 12a to 12p. Respective bits s0 to s15 to which an initial value s formed from 16 bits correspond are respectively input to the inputs at the respective one sides of the 16 selectors 13a to 13p. Outputs g1 to g15 of the flip-flops 12b to 12p are respectively input to the inputs at the respective other sides of the 15 selectors 13a to 13o except for the most significant bit, and an output g0 of the flip-flop 12a having the least significant bit is input to the input at the other side of the selector 13p having the most significant bit. A synchronous preset signal q is input in parallel to the control terminals of the selectors 13a to 13p. The outputs of the selectors 13a to 13p are respectively input to the data inputs of the flip-flops 12a to 12p. The write clock ck1 is input in parallel to the clock inputs of the flip-flops 12a to 12p, and an asynchronous reset signal r is input in parallel to the asynchronous reset terminals. The outputs of the flip-flops 12a to 12p are output as output signals g0 to g15.

In the ring counter 6a shown in FIG. 5, the asynchronous reset signal r is made to be in an active state, for example, '0' during a given period, whereby all the bits of the output signals g0 to g15 are initialized to be '0'. Thereafter, when the synchronous preset signal q is made to be in an active state, initial values s0 to s15 are selected at the selectors 13a to 13p, fetched into the flip-flops 12a to 12p so as to synchronize a rise of the clock signal ck1, and output as the output signals g0 to g15.

Thereafter, when the synchronous preset signal q is made to be in an inactive state, the initial value data fetched into the flip-flops are circulated by being transferred one bit by one bit from the most significant bit to the least significant bit and being returned from the least significant bit to the most significant bit every time when the clock signal ck1 rises.

In the ring counter 6a, the selectors 13a to 13p are provided so as to be able to preset arbitrary initial values. Provided that the flip-flops 12a to 12p with asynchronous sets are used, and fixed initial values are set by the asynchronous reset signal r, the selectors 13a to 13p can be omitted. In contrast thereto, in the ring counter 6a, the asynchronous reset signal r is not necessarily needed. When the asynchronous reset signal r is served as a reset signal for the entire elastic buffer, there is the advantage that the initial values can be settled by inputting the asynchronous reset signal r. In order to use the ring counter shown in FIG. 5 as the other ring counters 6b and 6c, the initial value data are appropriately changed, and the clock signal is changed from ck1 to ck2, and the timing of the synchronous preset signal is adjusted.

Figure 6:
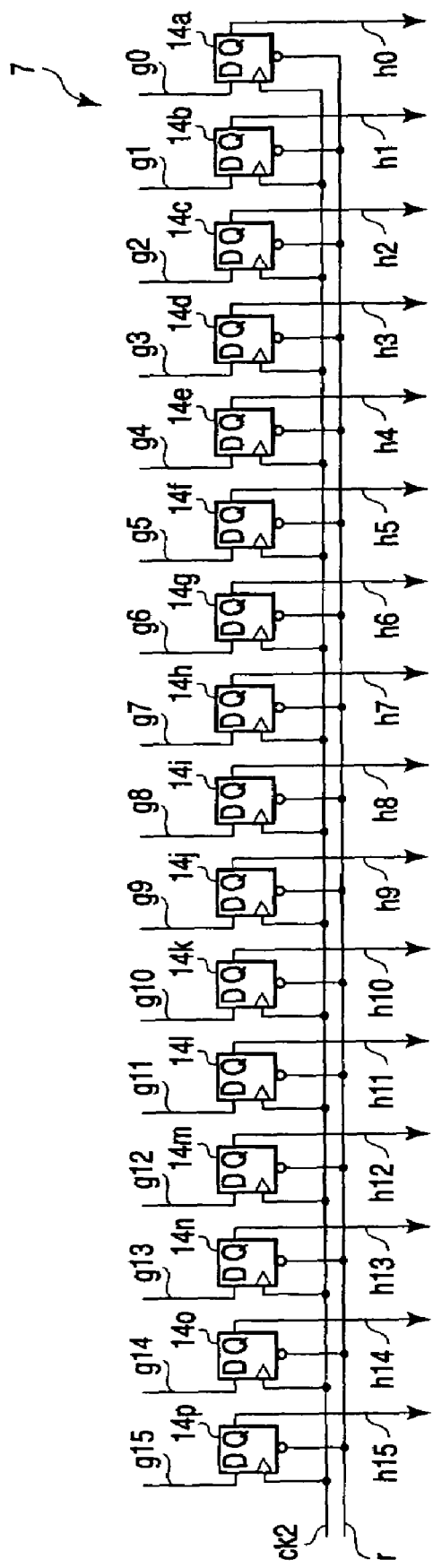
FIG. 6 is a circuit diagram showing one example of a temporary storage circuit for use in the elastic buffer in FIG. 4.

As the temporary storage circuit 7 in FIG. 4, for example, a circuit shown in FIG. 6 can be used. FIG. 6 shows one example when the temporary storage circuit 7 in FIG. 4 has a 16-bit configuration. The temporary storage circuit 7 has 16 flip-flops 14a to 14p.

In FIG. 6, the signals g0 to g15 corresponding to an output signal g formed from 16 bits of the ring counter 6a are respectively input to the data inputs of the flip-flops 14a to 14p, and the read clock signal ck2 is input in parallel to the clock inputs. An asynchronous reset signal r is input in parallel to the asynchronous reset terminals of the flip-flops 14a to 14p. 16-bit output signals h0 to h15 are output from the outputs of the flip-flops 14a to 14p.

In the temporary storage circuit 7, the asynchronous reset signal r is made to be in an active state during a given period, whereby all the bits of the output signals h0 to h15 are initialized to be 0. Thereafter, the input signals g0 to g15 are fetched into the flip-flops 14a to 14p every time when the clock signal ck2 rises, and are output as the output signals h0 to h15.

Figure 7:
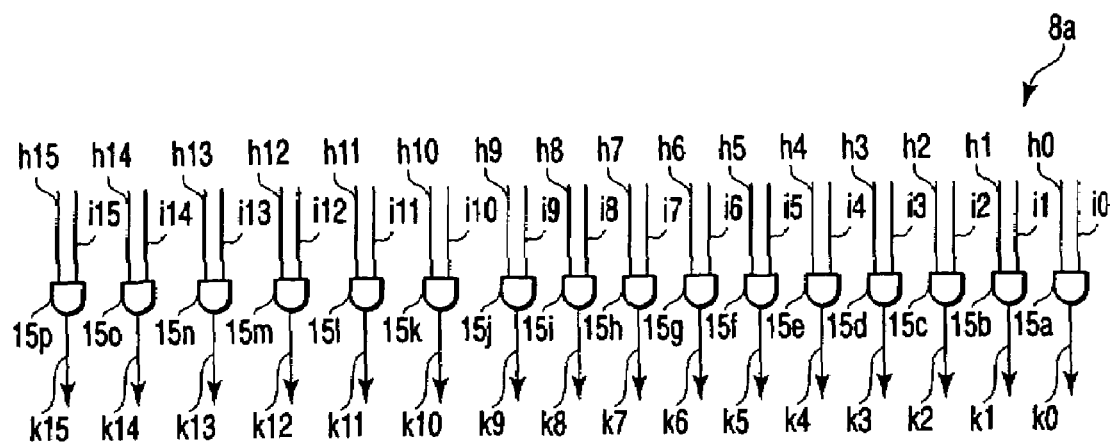
FIG. 7 is a circuit diagram showing one example of an AND circuit group for use in the elastic buffer in FIG. 4.

As the AND circuit groups 8a and 8b in FIG. 4, for example, a circuit group having the configuration shown in FIG. 7 can be respectively used. FIG. 7 shows one example when the AND circuit group 8a has a 16-bit configuration. The AND circuit group 8a has 16 AND circuits 15a to 15p.

In FIG. 7, the signals h0 to h15 of corresponding bits in the output signal h of 16 bits output from the temporary storage circuit 7 are input to the inputs at one sides of the AND circuits 15a to 15p, and signals i0 to i15 of corresponding bits in an output signal i of 16 bits output from the ring counter 6b are input to the inputs at the other sides. The outputs of the AND circuits 15a to 15p are output as output signals k0 to k15.

Figure 8:
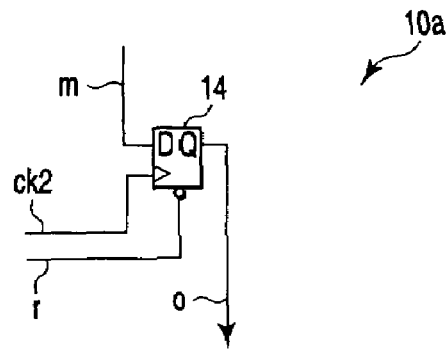
FIG. 8 is a circuit diagram showing one example of a storage circuit for use in the elastic buffer in FIG. 4.

As the storage circuits 10a and 10b in FIG. 4, for example, a circuit shown in FIG. 8 can be used. FIG. 8 shows a configuration of one example of the storage circuit 10a in FIG. 4. The storage circuit 10a is formed from a flip-flop 14.

In the same way as the flip-flop in the temporary storage circuit 7 shown in FIG. 6, the flip-flop 14 shown in FIG. 8 is reset by an asynchronous reset signal r, and an input signal m is fetched into the inside from the data input so as to synchronize the clock signal ck2, and is output as an output signal o. In FIG. 4, the clock signal supplied to the storage circuit 10a is omitted in order to make the drawing easy to see. However, provided that an underflow signal UF and an overflow signal OF are latched outside, the storage circuit 10a can be composed of a delay circuit or the like without using a clock signal.

Figure 9:
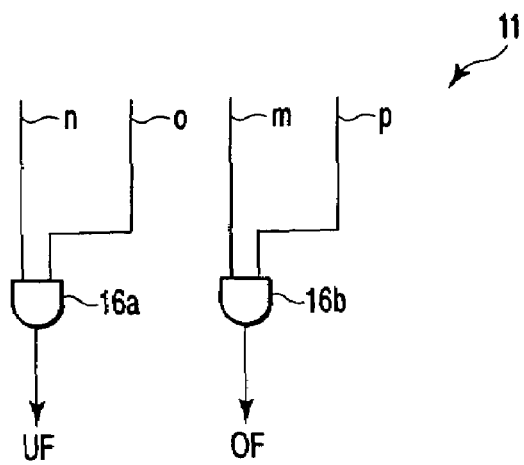
FIG. 9 is a circuit diagram showing one example of a decode circuit for use in the elastic buffer in FIG. 4.

As the decode circuit 11 in FIG. 4, for example, a circuit shown in FIG. 9 can be used. FIG. 9 shows a configuration of one example of the decode circuit 11 in FIG. 4. The decode circuit 11 has two AND circuits 16a and 16b.

In FIG. 9, an output signal n of the OR circuit 9b is input to the input at one side of the AND circuit 16a, and an output signal o of the storage circuit 10a is input to the other input. The output of the AND circuit 16a is output as an underflow signal UF. An output signal m of the OR circuit 9a is input to the input at one side of the AND circuit 16b, and an output signal p of the storage circuit 10b is input to the other input. The output of the AND circuit 16b is output as an overflow signal OF.

Next, operations of the elastic buffer in FIG. 4 will be described. First, the write address counter 1 and the ring counter 6a are made to simultaneously operate, and the input data Din is provided to the storage circuit 3 so as to synchronize the write clock signal ck1. At a stage when the data are accumulated up to half of the storage capacity of the storage circuit 3, the read address counter 2 and the ring counters 6b and 6c are made to simultaneously operate. The fact that the accumulated data in the storage circuit 3 has reached the half of the storage capacity is detected by utilizing an internal flag or the like by a control circuit (not shown), and the read address counter 2 and the ring counters 6b and 6c are notified of the fact.

In the ring counter 6a, 16-bit data in which such that regions of adjacent 2 bits or more (bit fields) have the same values, and portions other than the regions of 2 bits or more have values different from those is set as an initial value. Here, a case where 16-bit data in which such that, for example, the 2 higher significant bits on the left edge are 1, and all the other bits are 0, i.e., '1100000000000000' is used as an initial value will be described. The 16-bit output signal g of the ring counter 6a varies so as to synchronize the write clock signal ck1 as shown in the following Table 1.

TABLE 1

| Cycle | Output |
| --- | --- |
| First cycle | 1100000000000000 |
| Second cycle | 0110000000000000 |
| Third cycle | 0011000000000000 |
| Fourth cycle | 0001100000000000 |
| Fifth cycle | 0000110000000000 |
| Sixth cycle | 0000011000000000 |
| Seventh cycle | 0000001100000000 |
| Eighth cycle | 0000000110000000 |
| Ninth cycle | 0000000011000000 |
| Tenth cycle | 0000000001100000 |
| Eleventh cycle | 0000000000110000 |
| Twelfth cycle | 0000000000011000 |
| Thirteenth cycle | 0000000000001100 |
| Fourteenth cycle | 0000000000000110 |
| Fifteenth cycle | 0000000000000011 |
| Sixteenth cycle | 1000000000000001 |

On and after the seventeenth cycle, the cycles are repeated from the first cycle. Here, there is a bit whose value is 1, which does not vary in the adjacent cycles. Supposing that the right edge is the $0^{th}$ bit, it is the $14^{th}$ bit in the first cycle and the second cycle, and the $13^{th}$ bit does not vary in the second cycle and the third cycle. Namely, '1' on the right side of the adjacent two '1's is preserved in the following cycle.

Figure 10:
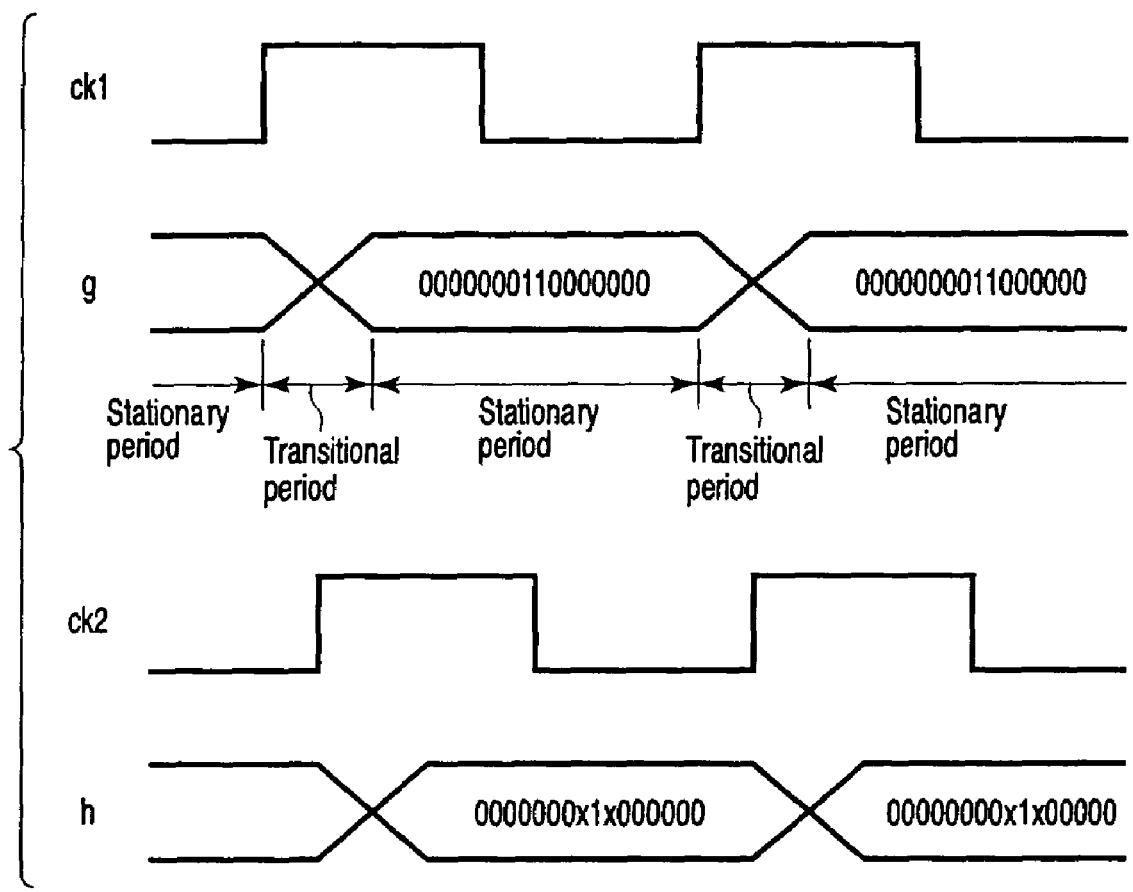
FIG. 10 is a timing chart for explanation of a metastable state generated at an input side of the temporary storage circuit for use in the elastic buffer in FIG. 4.

FIG. 10 is a diagram for explanation of a metastable state generated when an output signal g of the ring counter 6a in FIG. 4 is fetched into the temporary storage circuit 7. The clock signals ck1 and ck2 and the signals g and h shown in FIG. 10 respectively correspond to those in FIG. 4. In FIG. 10, because the rising edge of the read clock signal ck2 is close to the transitional period of the output signal g, a request for a setup time and a hold time based on the rising edge of the clock signal ck2 in the temporary storage circuit 7 is not satisfied, and the data in a metastable state is read.

However, because a way in which the output signal g of the ring counter 6a varies is as described above, only the bits on the left and right of '1' on the right side are made to be in a metastable state. Accordingly, in the temporary storage circuit 7, the indefinite bits denoted by x in FIG. 10 exist on the left and right of '1' on the right side.

Next, operations for detecting an overflow state and an underflow state will be described. The read address counter 2 and the ring counters 6b and 6c start to operate when half of the storage capacity of the storage circuit 3 is filled with input data.

Figure 11:
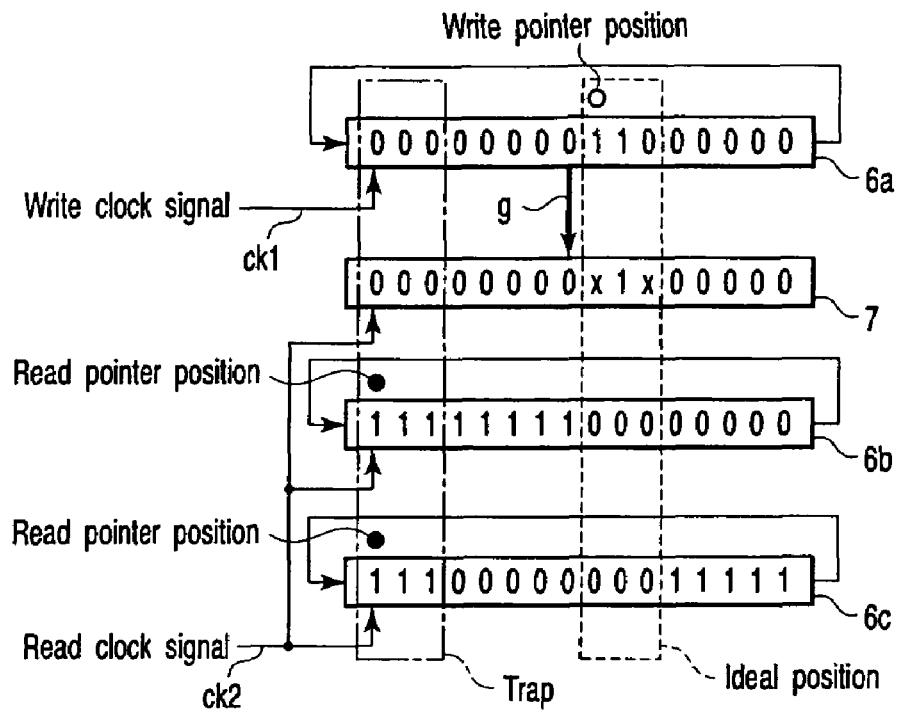
FIG. 11 is a diagram showing a state of three ring counters and the temporary storage circuit immediately after half of a first-in first-out system storage circuit are filled up with data in the elastic buffer of the first embodiment.

FIG. 11 shows a state of the ring counters 6a to 6c and the temporary storage circuit 7 immediately after half of the storage circuit 3 is filled with data (here, a state in which 8 data have been accumulated). At this time, the ring counters 6b and 6c are in a initial state. In the ring counters 6b and 6c, 16-bit data in which such that regions of adjacent 3 bits or more (bit fields) have same values, and portions other than the regions of 3 bits or more have values different from those are set as initial values. Here, a case where 16-bit data such that, for example, the left half 8 bits at the higher side are 1, and all the other right half 8 bits are 0, i.e., '1111111100000000' is used as an initial value of the ring counter 6b, and 16-bit data such that, for example, 3 bits on the left edge at the higher side and 5 bits on the right edge at the lower side are 1, and all the 8 bits therebetween are 0, i.e., '1110000000011111' is used as an initial value of the ring counter 6c will be described.

In FIG. 11, the ck1 and ck2 are a read clock signal and a write clock signal, and the g is an output signal of the ring counter 6a. The output signal g of the ring counter 6a is input to the temporary storage circuit 7. The other signals are omitted in order to make the drawing easy to see. The white circle in the drawing indicates a bit of the ring counter 6a corresponding to a write pointer position, and the black circles indicate bits of the ring counters 6b and 6c corresponding to read pointer positions. When the white circle and the black circles are at a same bit position in the horizontal direction, an overflow or an underflow is brought about.

The 3-bit data included in the region of the broken line shown in FIG. 11 are 0 in both of the ring counters 6b and 6c. When all the bits other than 0 stored in the temporary circuit 7 are fallen into the region in the broken line, both of the outputs m and n of the OR circuits 9a and 9b in FIG. 4 are made to be 0. Here, this is called an ideal position. The 3-bit data included in the region of the dashed line shown in FIG. 11 are 1 in both of the ring counters 6b and 6c. Even when some of the bits other than 0 stored in the temporary circuit 7 are fallen into the region in the dashed line, when it is an indefinite bit x, in a case of x=1, both of the outputs m and n of the OR circuits 9a and 9b in FIG. 4 are made to be 1. Here, this is called a trap. Note that the above-described indefinite bit x is not in a metastable state, and the value thereof is 1 or 0, and just cannot be foreseen.

In FIG. 11, a pattern 'x1x' including the indefinite bits x stored in the temporary circuit 7 is at an ideal position. The values of the above-described signals m and n are respectively stored in the storage circuits 10a and 10b in FIG. 4, and are output respectively as o and p. Hereinafter, those signals m and n are respectively called a lagging close signal and a leading close signal, and the o and p are respectively called a lagging close hysteresis and a leading close hysteresis.

Next, a case where the write pointer position is out of an ideal position, and moves in the direction of underflowing will be described.

Figure 12:
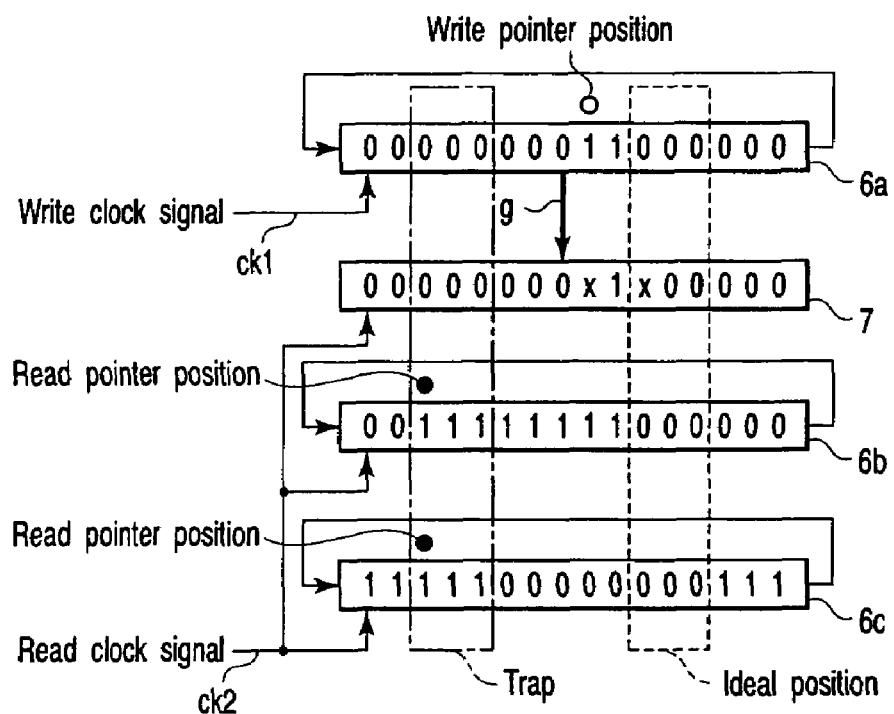
FIG. 12 is a diagram showing a state of the three ring counters and the temporary storage circuit when a write pointer has moved in a direction of underflowing in the elastic buffer of the first embodiment.

FIG. 12 shows a state in which the write pointer has moved in a direction of underflowing. At that time, an underflow has not been brought about yet. This is as a result that a phase difference of the write clock signal with respect to the read clock signal has increased in the lagging direction. The main cause which brings about such a state is that a write clock frequency is lower than a read clock frequency. When the read pointer and the write pointer approach to the positions shown in FIG. 12, the bit positions of definite '1' among the data stored in the temporary storage circuit 7 are coincident with the positions of the bits of the ring counter 6b whose values are 1 (hereinafter, those bits are called detection bits), and thus, the lagging close signal m is exactly made to be 1. Further, with respect to the pattern to be detected 'x1x' in the data stored in the temporary storage circuit 7, any bit is not overlapped onto the detection bits of the ring counter 6c. Therefore, the leading close signal n is exactly made to be 0. Namely, FIG. 12 shows a positional relationship among the pointers in which m=1 and n=0 are exactly established without being affected by the indefinite bits 'x' in the temporary storage circuit 7.

Figure 13:
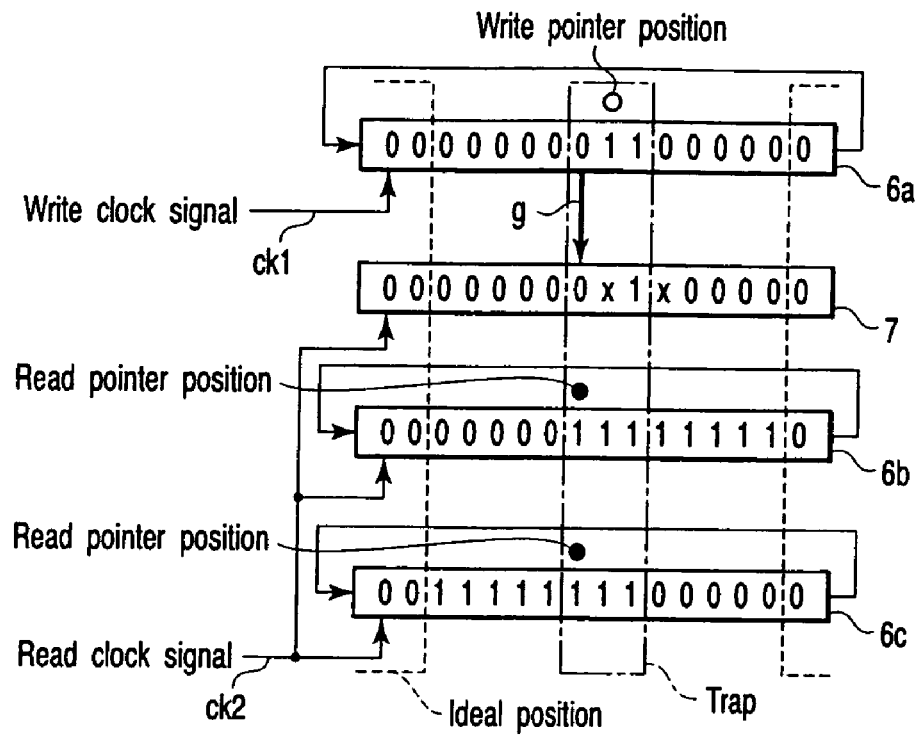
FIG. 13 is a diagram showing a state of the three ring counters and the temporary storage circuit in a case of being detected as an underflow in the elastic buffer of the first embodiment.

Next, an underflow state will be described. FIG. 13 shows a relative relationship among the pointer positions in a case of being detected as an underflow. This is as a result that a phase difference of the write clock signal with respect to the read clock signal has further increased in the lagging direction from the state of FIG. 12. When the read pointer and the write pointer approach to the positions shown in FIG. 13, because the definite '1' in the data stored in the temporary storage circuit 7 are overlapped onto the trap, both of the lagging close signal m and the leading close signal n are exactly made to be 1.

FIG. 13 shows a positional relationship among the pointers in which m=n=1 is exactly established without being affected by the indefinite bits 'x' in the data stored in the temporary storage circuit 7. However, when the x on the right side of the pattern to be detected 'x1x' is overlapped onto a trap, m=n=1 is established a little earlier in a case of x=1. In the positional relationship among the pointers shown in FIG. 13 as well, the pointers are not overlapped onto one another, and thus, an underflow has not been brought about yet. Here, margins of 1 bit in the ring counters 6a to 6c for detecting an underflow are provided by ensuring the trap of 3 bits. An overflow is not brought about until data is actually written into the storage circuit 3 even when the pointers are overlapped onto one another. However, because an underflow is brought about when the pointers are merely overlapped, it is necessary to take care of the point.

Figure 14:
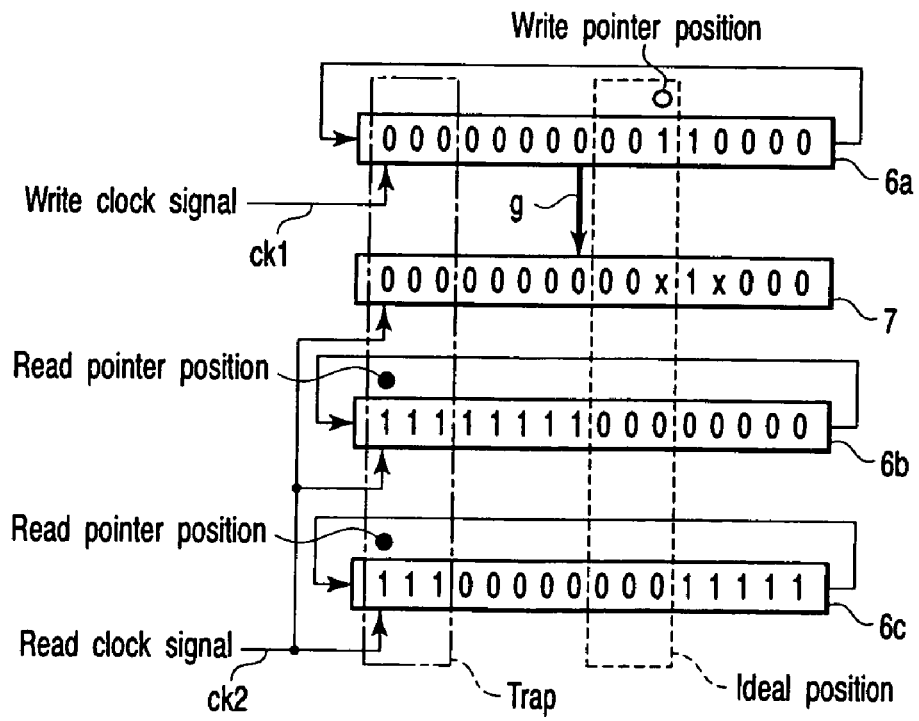
FIG. 14 is a diagram showing a state of the three ring counters and the temporary storage circuit when a write pointer moves in a direction of overflowing in the elastic buffer of the first embodiment.

Next, a case where the write pointer position is out of an ideal position, and moves in the direction of overflowing will be described. FIG. 14 shows a state in which the write pointer has moved in the direction of overflowing. At that time, an overflow has not been brought about yet. This is as a result that a phase difference of the write clock signal with respect to the read clock signal increases in the leading direction. The main cause which brings about such a state is that a write clock frequency is higher than a read clock frequency. When the read pointer and the write pointer approach to the positions shown in FIG. 14, the definite '1' in the data stored in the temporary storage circuit 7 are overlapped onto the detection bits of the ring counter 6c, and thus, the leading close signal n is exactly made to be 1. Further, with respect to the pattern to be detected 'x1x' in the data stored in the temporary storage circuit 7, any bit is not overlapped onto the detection bits of the ring counter 6b, so that the lagging close signal m is exactly made to be 0. FIG. 14 shows a positional relationship among pointers in which m=0 and n=1 are exactly established without being affected by the indefinite bits 'x' in the temporary storage circuit 7.

Figure 15:
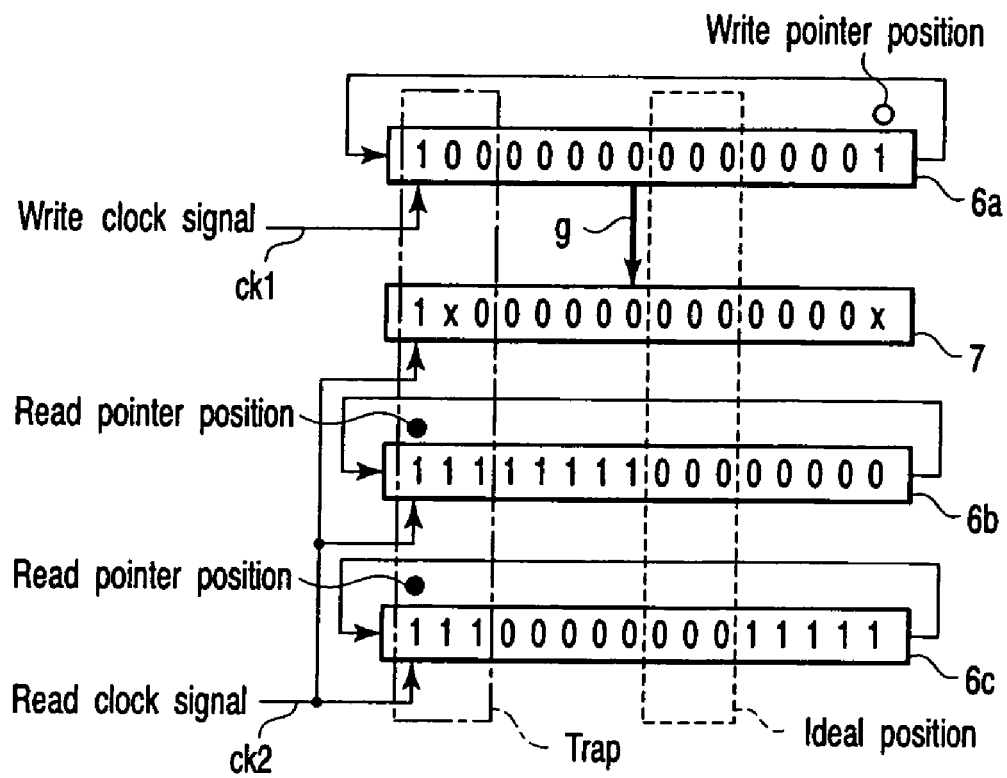
FIG. 15 is a diagram showing a state of the three ring counters and the temporary storage circuit in a case of being detected as an overflow in the elastic buffer of the first embodiment.

Next, an overflow state will be described. FIG. 15 shows a relative relationship among the pointer positions in a case of being detected as an overflow. This is as a result that a phase difference of the write clock signal with respect to the read clock signal has further increased in the leading direction from the state of FIG. 14. When the read pointer and the write pointer approach to the positions shown in FIG. 15, the definite '1' in the data stored in the temporary storage circuit 7 are overlapped onto the trap. Thus, both of the lagging close signal m and the leading close signal n are exactly made to be 1.

FIG. 15 shows a positional relationship among the pointers in which m=n=1 is exactly established without being affected by the indefinite bits 'x' in the data stored in the temporary storage circuit 7. When the x on the right side of the pattern to be detected 'x1x' in the data stored in the temporary storage circuit 7 is overlapped onto the trap, m=n=1 is established a little earlier in a case of x=1. In the positional relationship among the pointers shown in FIG. 15 as well, the pointers are not overlapped, and thus, an overflow has not been brought about yet. Here, margins of 1 bit of the ring counters 6a to 6c for detecting an overflow are provided by ensuring the trap of 3 bits. An overflow is not brought about until data is actually written into the storage circuit 3 even when the pointers are overlapped. However, because the write clock signal varies faster than the read clock signal, it is safer to provide a margin. In order to detect the overflow faster, the output g of the ring counter 6a are circulated by being transferred one bit, and are supplied to the temporary storage circuit 7.

As described above, when an overflow or an underflow is brought about, the lagging close signal m and the leading close signal n are made to be m=n=1 in any case, and it cannot be determined on the basis of only these signals whether an overflow has been brought about or an underflow has been brought about.

However, it is impossible in an applied manner that an overflow or an underflow is brought about immediately after the state the pointers are at the ideal position shown in FIG. 11. This is because such a situation is a case where a ratio of the frequencies of the write and read clock signals is about half of the storage capacity of the storage circuit 3, and it is impossible to deliver the data by the elastic buffer if an overflow or an underflow is immediately brought about. Accordingly, before m=n=1 is established, there is a period in which only one of the m and n is 1, and the other is 0. The state is preserved as a lagging close hysteresis o and a leading close hysteresis p still when m=n=1 is established for the first time.

It is understood from the above description that o=1 and p=0 before an underflow is brought about, and o=0 and p=1 before an overflow is brought about. Therefore, provided that the four signals m, n, o, and p are decoded, an overflow and an underflow can be distinguished.

The following Table 2 expresses a situation of decoding carried out in the decode circuit 11 shown in FIG. 9 in a truth table. A horizontal lines '-' denote "don't care" meaning that it may by any of 0 and 1 (which is in the same way hereinafter). The decode circuit 11 outputs a signal e and a signal f, which are calculated by the following logical expressions on the basis of an output m of the OR circuit 9a, an output n of the OR circuit 9b, an output o of the storage circuit 10a, and an output p of the storage circuit 10b, respectively as an underflow signal UF and an overflow signal OF.

$$e = n \cdot o \quad (1)$$

$$f = m \cdot p \quad (2)$$

TABLE 2

| Input signal | | | | Output signal | |
| --- | --- | --- | --- | --- | --- |
| m | n | o | p | e(UF) | f(OF) |
| 0 | 0 | — | — | 0 | 0 |
| 0 | 1 | 0 | — | 0 | 0 |
| 0 | 1 | 1 | — | 1 | 0 |
| 1 | 0 | — | 0 | 0 | 0 |
| 1 | 0 | — | 1 | 0 | 1 |
| 1 | 1 | 0 | 0 | 0 | 0 |
| 1 | 1 | 0 | 1 | 0 | 1 |
| 1 | 1 | 1 | 0 | 1 | 0 |
| 1 | 1 | 1 | 1 | 1 | 1 |

In the Table 2, in a case of o=p=1 and m=n=1, both of an underflow signal UF and an overflow signal OF are made to be 1, whereby it is warned that an overflow or underflow state has not been recovered even after detecting it. Further, in the Table 2, in a case where there is a hysteresis of o=p=0, and of m=n=1 denoting that an overflow or an underflow has been brought about, e=f=0 is established. This is a state in which an overflow or an underflow has been immediately brought about from an ideal position, which is impossible in an applied manner. However, provided that e=f=1 is established even in this case, the exterior can be notified of the abnormal situation.

In the descriptions of FIGS. 11 to 15, the trap of 3-bit is used. However, when the decoding method in the Table 2 is applied, the trap can be made to have 0 bit. A 0-bit trap is a state in which the detection bits of the ring counters 6b and 6c are not overlapped onto one another, and the both border on each other in the vicinity of the read pointers. In such a case, when the pattern to be detected 'x1x' in the data stored in the temporary storage circuit 7 is overlapped onto both of the detection bits of the ring counters 6b and 6c, and when the x overlapped onto the detection bits different from the detection bit onto which the central 1 has been overlapped are 1, m=n=1 is established. However, the x are 0, there are cases in which m=n=1 is not established. In that case, in a case of o=1, m=0, and n=1, it is understood that the pattern to be detected 'x1x' has slipped through the above-described 0-bit trap in a state in which there is a lagging close hysteresis, and therefore, it can be detected as an underflow. On the other hand, in a case of p=1, m=1, and n=0, it is understood that the pattern to be detected 'x1x' has slipped through the above-described 0-bit trap in a state in which there is a leading close hysteresis, and therefore, it can be detected as an overflow.

Even in a case where a trap has 1 bit or more, it is supposed that the decoding method in the Table 2 is used. In this case, even when the pattern to be detected 'x1x' in the data stored in the temporary storage circuit 7 slips through the trap during one cycle of the read clock signal for some reason, an overflow and an underflow can be detected. Note that the initial values (bit patterns) of the ring counters 6a to 6c shown in FIGS. 11 to 15 can be used for all the embodiments including the embodiment which will be described hereinafter.

The decode circuit 11 shown in FIG. 9 described above is one example of a circuit configuration for realizing the truth Table serving as the Table 2, and is composed of only two AND circuits with two inputs. In accordance with the present embodiment, an overflow and an underflow can be detected by such a simple circuit, and an attempt can be made to make operations of a detection circuit high-speed. Moreover, there is the advantage that the positional relationship among the write and read pointers can be grasped on the basis of a lagging close signal m and a leading close signal n. This is an essential function in a case where it is necessary to correct pointer positions in accordance with a relative position between the pointers.

However, in the truth table serving as the Table 2, slipping-through the ideal position and slipping-through the trap are not distinguished from one another. Therefore, when the decoding method of the Table 2 is used, it is assumed that the ideal position has 3 bits or more, and the pattern to be detected 'x1x' in the data stored in the temporary storage circuit 7 does not slip through the ideal position. Further, in order to recover from an overflow or an underflow to a normal operation, one of the following three methods must be used.

(Recovering method 1) A relative position between the read and write pointers is initialized such that an entire pattern to be detected falls into an ideal position.

(Recovering method 2) An overflow and an underflow are sufficiently dissolved by a method other than the initialization of the pointers, and at the same time, the storage circuits 10a and 10b are reset.

(Recovering method 3) After an overflow and an underflow are sufficiently dissolved by a method other than the initialization of the pointers, an underflow signal e and an overflow signal f are ignored only during one cycle of reading by an external circuit.

The first reason is as follows. Slipping-through the trap or a 0-bit trap is permitted, and consequently, if the pattern to be detected slips through in the opposite direction after an underflow or an overflow is once brought about, next, it is detected as an overflow or an underflow. The second reason is as follows. Even when the pattern to be detected does not slip through, and is detected as an overflow or an underflow, the hysteresis of o=p=1 is left in the storage circuits 10a and 10b, and consequently, a detection signal is generated again if a recovering method by which m=n=0 is not established is used. The first reason is not dissolved even if the truth table is modified. The second reason can be dissolved if the truth table is modified.

Second Embodiment

Figure 16:
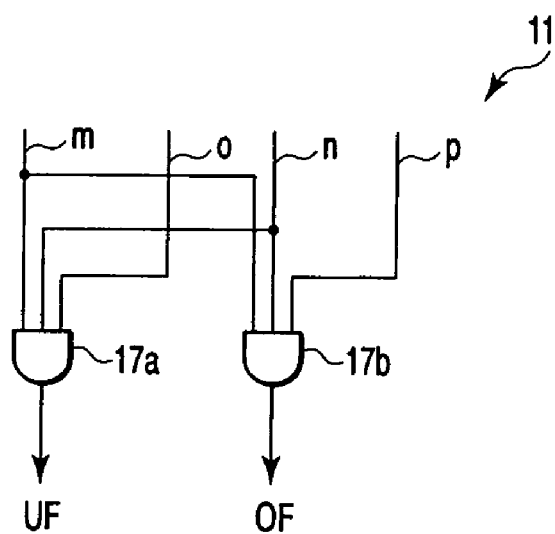
FIG. 16 is a circuit diagram showing a concrete configuration of a decode circuit for use in an elastic buffer according to a second embodiment of the present invention.

FIG. 16 shows another concrete configuration of the decode circuit 11 in FIG. 4. The decode circuit 11 shown in FIG. 4 is constituted of two AND circuits 17a and 17b with three inputs. The signals m, n, o, p, UF, and OF in FIG. 16 correspond to those in FIG. 4. The output signal m of the OR circuit 9a, the output signal n of the OR circuit 9b, and the output signal o of the storage circuit 10a are input to the AND circuit 17a. The output signal m of the OR circuit 9a, the output signal n of the OR circuit 9b, and the output signal p of the storage circuit 10b are input to the AND circuit 17b.

Table 3 is a truth table corresponding to the decode circuit shown in FIG. 16. Slipping-through the trap by the pattern to be detected 'x1x' in the data stored in the temporary storage circuit 7 is permitted in the truth table serving as the above Table 2, and on the other hand, slipping-through the ideal position is permitted in the Table 3. However, the ideal position is required to have 2 bits or more. If the ideal position is made to have 1 bit or zero, there are cases in which m=n=1 is established when the pattern to be detected slips through the ideal position, and therefore, it is detected as an overflow or an underflow. Further, because the underflow signal e and an overflow signal f are generated only in a case of m=n=1, the trap is required to have 1 bit or more.

The decode circuit 11 outputs the signal e and the signal f, which are calculated by the following logical expressions on the basis of the output m of the OR circuit 9a, the output n of the OR circuit 9b, the output o of the storage circuit 10a, and the output p of the storage circuit 10b, respectively as an underflow signal UF and an overflow signal OF.

$$e = m \cdot n \cdot o \quad (3)$$

$$f = m \cdot n \cdot p \quad (4)$$

TABLE 3

| Input signal | | | | Output signal | |
|---|---|---|---|---|---|
| m | n | o | p | e(UF) | f(OF) |
| 0 | 0 | — | — | 0 | 0 |
| 0 | 1 | — | — | 0 | 0 |
| 1 | 0 | — | — | 0 | 0 |
| 1 | 1 | 0 | 0 | 0 | 0 |
| 1 | 1 | 0 | 1 | 0 | 1 |
| 1 | 1 | 1 | 0 | 1 | 0 |
| 1 | 1 | 1 | 1 | 1 | 1 |

When the decode circuit 11 based on the truth table serving as the Table 3 and a trap having a width of 1 bit or more are used, there is no need to use the methods 1 to 3 described above in particular at the time of recovering from an overflow or an underflow to a normal operation. However, those may be used.

In accordance with the Table 3, even in a case of o=p=1, e=f=0 is established when one of m and n is 0. Therefore, at the time of recovering to a normal operation by using any method, a detection signal is not generated. Further, when an overflow or an underflow is brought about again due to a method for dissolving an overflow or an underflow being not sufficient, both of the underflow signal e and the overflow signal f are made to be 1, and it is warned that an overflow or underflow state has not been recovered even after detecting it.

Third Embodiment

Figure 17:
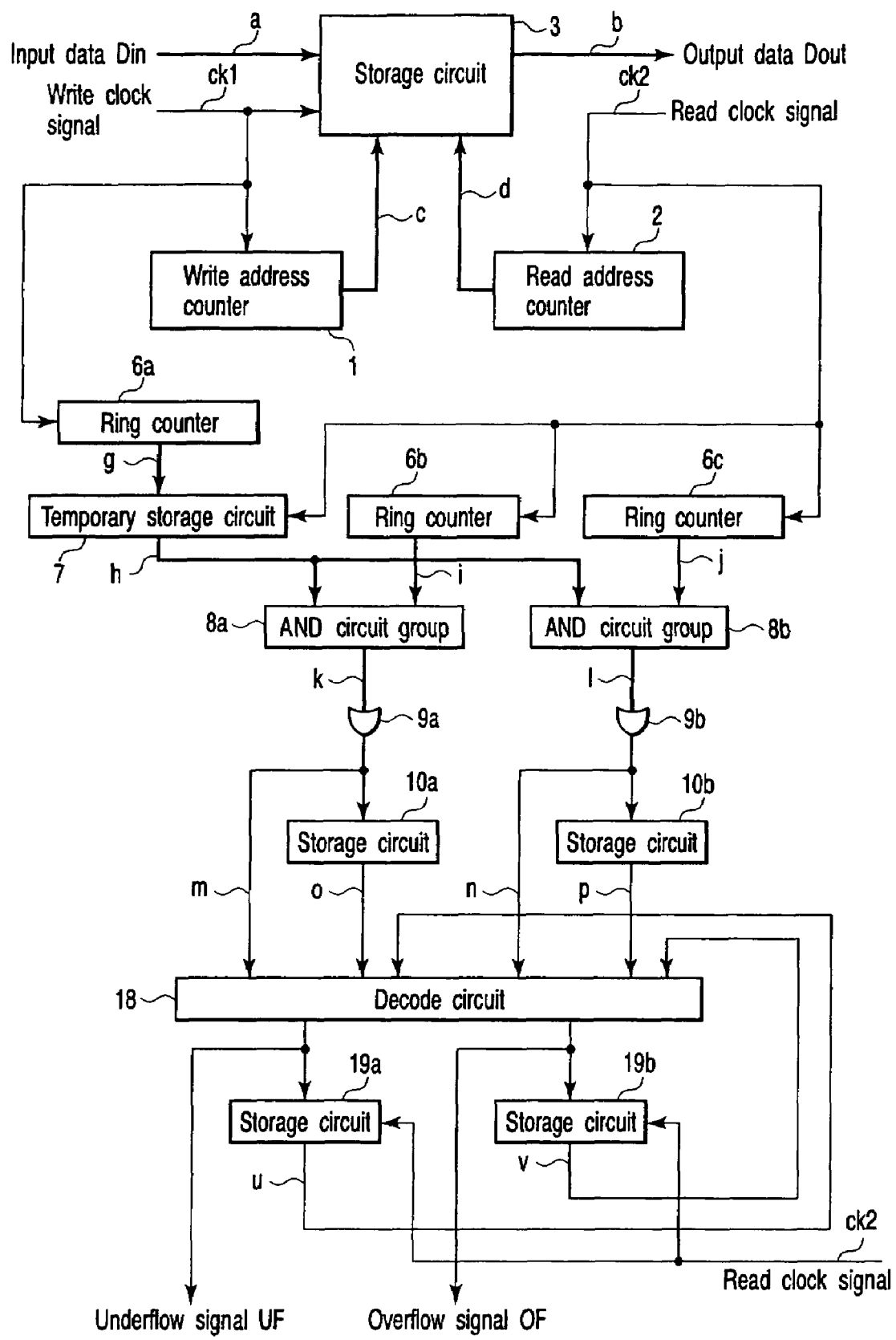
FIG. 17 is a block circuit diagram of an elastic buffer according to a third embodiment of the present invention.

FIG. 17 shows an elastic buffer according to a third embodiment of the invention. Note that, in FIG. 17, portions corresponding to those in FIG. 4 described above are denoted by the same reference numerals, and descriptions thereof will be omitted. Hereinafter, only portions different from those in FIG. 4 will be described. In the elastic buffer of FIG. 17, a decode circuit 18 different from the decode circuit 11 in FIG. 4 is provided, and two storage circuits 19a and 19b are newly added.

The decode circuit 18 outputs an underflow signal UF and an overflow signal OF. The underflow signal UF and the overflow signal OF are respectively input to the storage circuits 19a and 19b. Output signals from the storage circuits 19a and 19b are respectively input as state signals u and v to the decode circuit 18. The decode circuit 18 decodes the signals u and v along with the signals m, n, o, and p.

Figure 18:
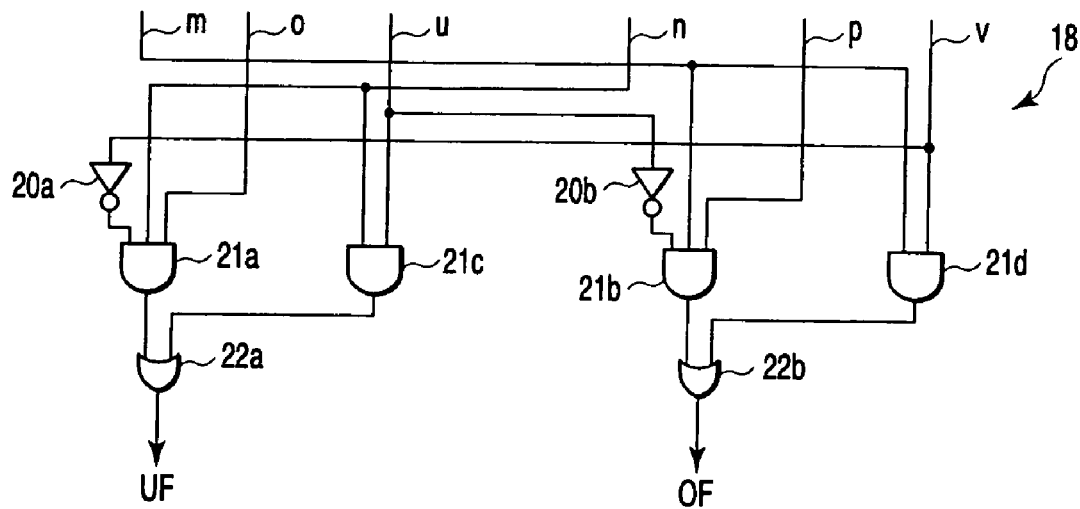
FIG. 18 is a circuit diagram showing a concrete configuration of a decode circuit for use in the elastic buffer according to the third embodiment.

As the decode circuit 18 in FIG. 17, for example, a circuit shown in FIG. 18 can be used. The decode circuit 18 in FIG. 18 is composed of two inverters 20a and 20b, four AND circuits 21a to 21d, and two OR circuits 22a and 22b.

The output signal v of the storage circuit 19b is input to the inverter 20a, and the inverter 20a outputs an inverse signal /v. The output signal /v of the inverter 20a, the output signal n of the OR circuit 9b, and the output signal o of the storage circuit 10a are input to the AND circuit 21a. The output signal n of the OR circuit 9b and the output signal u of the storage circuit 19a are input to the AND circuit 21c. The output signals of the AND circuits 21a and 21c are input to the OR circuit 22a, and the OR circuit 22a outputs an underflow signal UF.

The output signal u of the storage circuit 19a is input to the inverter 20b, and the inverter 20b outputs an inverse signal /u. The output signal /u of the inverter 20b, the output signal m of the OR circuit 9a, and the output signal p of the storage circuit 10b are input to the AND circuit 21b. The output signal m of the OR circuit 9a and the output signal v of the storage circuit 19b are input to the AND circuit 21d. The output signals of the AND circuits 21b and 21d are input to the OR circuit 22b, and the OR circuit 22b outputs an overflow signal OF.

As the storage circuits 19a and 19b in FIG. 17, for example, the circuit having the configuration shown in FIG. 8 can be used in the same way as the storage circuits 10a and 10b. Note that, in FIG. 17, the read clock signal ck2 to be provided to the storage circuits 19a and 19b is, not omitted, but shown. It is preferable that the storage circuits 19a and 19b maintain data during one cycle of the read clock signal ck2.

In accordance with the elastic buffer of FIG. 17, when an overflow or an underflow is brought about, the fact is stored as state signals u and v in the storage circuits 19a and 19b. Differently from the first and second embodiments described above, in the third embodiment, a condition to recover from an overflow and an underflow can be determined by using the state signals. Accordingly, when an overflow or an underflow has not been dissolved after detecting it, it is possible to continuously detect an overflow or an underflow.

The following Table 4 is a truth table showing operations of the decode circuit 18 shown in FIG. 18. The decode circuit 18 outputs the signal e and the signal f, which are calculated by the following logical expressions on the basis of the output signals m and n of the OR circuits 9a and 9b, and the output signals o, p, u, and v of the storage circuits 10a, 10b, 19a, and 19b, respectively as an underflow signal UF and an overflow signal OF. Note that, in the following logical expressions, /a denotes an inverse of 'a', and a+code denotes a logical sum.

$$e = /v \cdot n \cdot o + u \cdot n \quad (5)$$

$$f = /u \cdot m \cdot p + v \cdot m \quad (6)$$

TABLE 4

| Input signal | | | | | | Output signal | |
|---|---|---|---|---|---|---|---|
| u | v | m | n | o | p | e(UF) | f(OF) |
| 0 | 0 | 0 | 0 | — | — | 0 | 0 |
| 0 | 0 | 0 | 1 | 0 | — | 0 | 0 |
| 0 | 0 | 0 | 1 | 1 | — | 1 | 0 |
| 0 | 0 | 1 | 0 | — | 0 | 0 | 0 |
| 0 | 0 | 1 | 0 | — | 1 | 0 | 1 |
| 0 | 0 | 1 | 1 | 0 | 0 | 0 | 0 |
| 0 | 0 | 1 | 1 | 0 | 1 | 0 | 1 |
| 0 | 0 | 1 | 1 | 1 | 0 | 1 | 0 |
| 0 | 0 | 1 | 1 | 1 | 1 | 1 | 1 |
| 0 | 1 | 0 | 0 | — | — | 0 | 0 |
| 0 | 1 | 0 | 1 | — | — | 0 | 0 |
| 0 | 1 | 1 | 0 | — | — | 0 | 1 |
| 0 | 1 | 1 | 1 | — | — | 0 | 1 |
| 1 | 0 | 0 | 0 | — | — | 0 | 0 |
| 1 | 0 | 0 | 1 | — | — | 1 | 0 |
| 1 | 0 | 1 | 0 | — | — | 0 | 0 |
| 1 | 0 | 1 | 1 | — | — | 1 | 0 |
| 1 | 1 | 0 | 0 | — | — | 0 | 0 |
| 1 | 1 | 0 | 1 | — | — | 1 | 0 |
| 1 | 1 | 1 | 0 | — | — | 0 | 1 |
| 1 | 1 | 1 | 1 | — | — | 1 | 1 |

In the Table 4, relationships among the input signals m, n, o, and p in a case of u=v=0, and the output signals e and f are completely the same as in the case of the Table 2. Namely, when an overflow or an underflow is detected for the first time from a state in which the pattern to be detected is at the ideal position, the decode circuit of FIG. 18 operates in completely the same way as the decode circuit of FIG. 9. Here, both of the underflow signal UF and the overflow signal OF are made to be 1 in a case of o=p=1 and m=n=1. This is, as a case which cannot be brought about rather than for warning, carried out so as to appropriately determine values of the e and f at that time for the purpose of simplifying the circuit. The reason for that the case cannot be brought about is that it is necessary for m=n=1 to be established from m=n=0 in one cycle in a case of u=v=0 and o=p=0 in order to realize this combination. In other cases, m=n=1 is detected as an overflow or an underflow, and the state signals are made to be not u=v=0. However, a condition to recover from u=v=1 is determined in consideration of the worst.

When an overflow or an underflow is once detected, and the state signals are made to be not u=v=0, the lagging close hysteresis o and the leading close hysteresis p are ignored, and the underflow signal UF and the overflow signal OF are determined on the basis of the state signals and the lagging and leading close signals m and n. Because the signals UF and OF denote values of the state signals u and v in the following cycle of the read clock signal ck2, a state transition is brought about.

Figure 19:
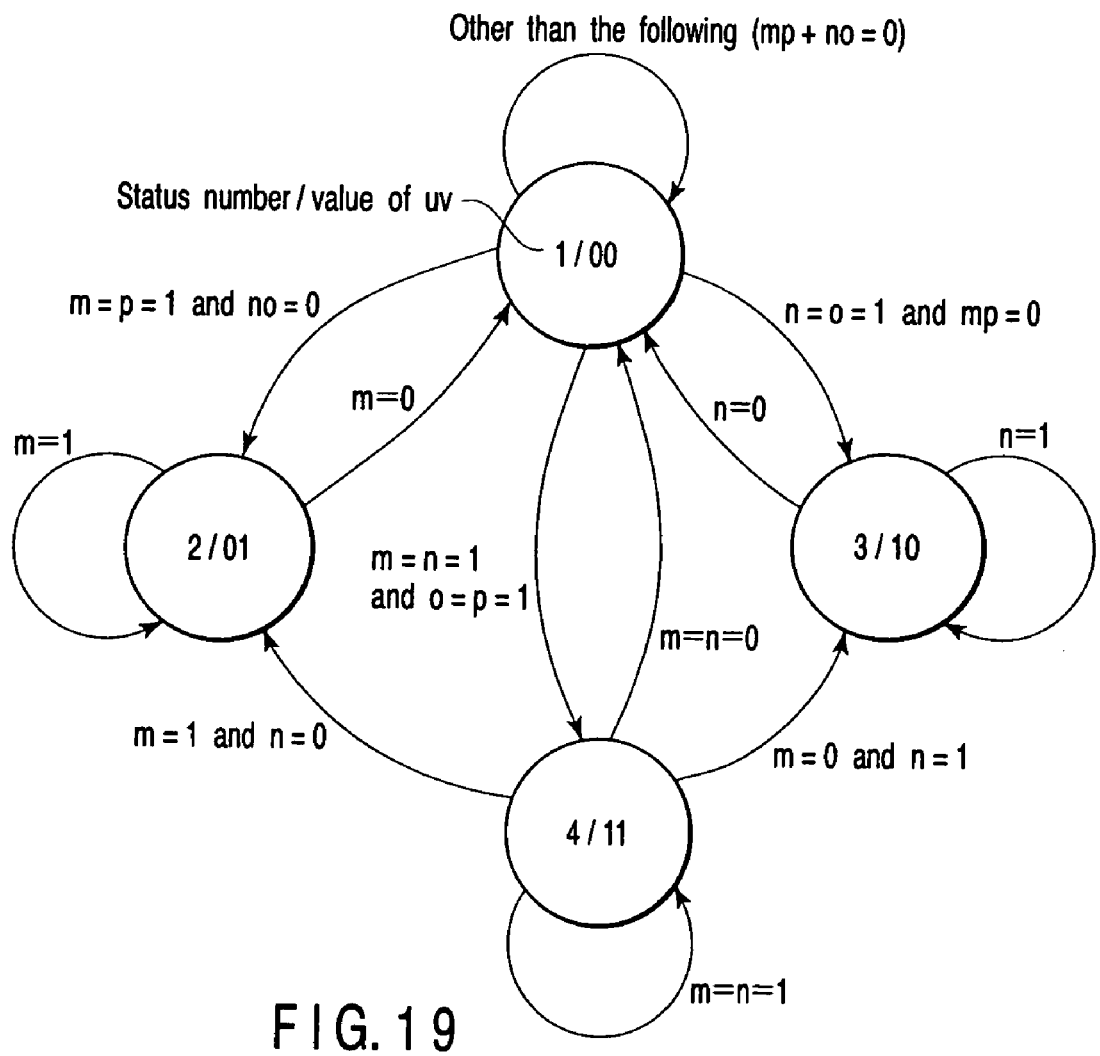
FIG. 19 is a state transition diagram of the elastic buffer according to the third embodiment.

FIG. 19 is a state transition diagram corresponding to the Table 4. The detection signal generating conditions and the situations of state transitions are clear on the basis of the truth table shown in the Table 4 and the state transition diagram shown in FIG. 19. Namely, when an overflow or an underflow is once brought about, the pattern to be detected 'x1x' in the temporary storage circuit 7 moves in a direction opposite to a direction of moving toward the trap up to that time, or continues to move in the direction, and the overflow or underflow signal is invariable until all the bits whose values are 1 in the pattern to be detected are fallen into the ideal position.

In the second embodiment, even after one of the signals UF and OF is made to be 1, both of the UF and OF are made to be 1 if the bits whose values are 1 in the pattern to be detected are overlapped onto the trap. Therefore, unless the signals UF and OF are latched at the external circuit, it cannot be distinguished whether an overflow has been brought about or an underflow has been brought about.

In contrast thereto, in accordance with the third embodiment, it can be detected without using an external circuit whether an overflow has been brought about or an underflow has been brought about. Note that, in the third embodiment, slipping-through a trap by a pattern to be detected or a 0-bit trap is permitted. However, as described in the description of the first embodiment, a bit width of 3 bits or more is allocated to the ideal position. Therefore, the third embodiment can be applied to a case where means for dissolving an overflow or underflow state is insufficient, or a case where there is a delay in coping therewith.

Fourth Embodiment

Figure 20:
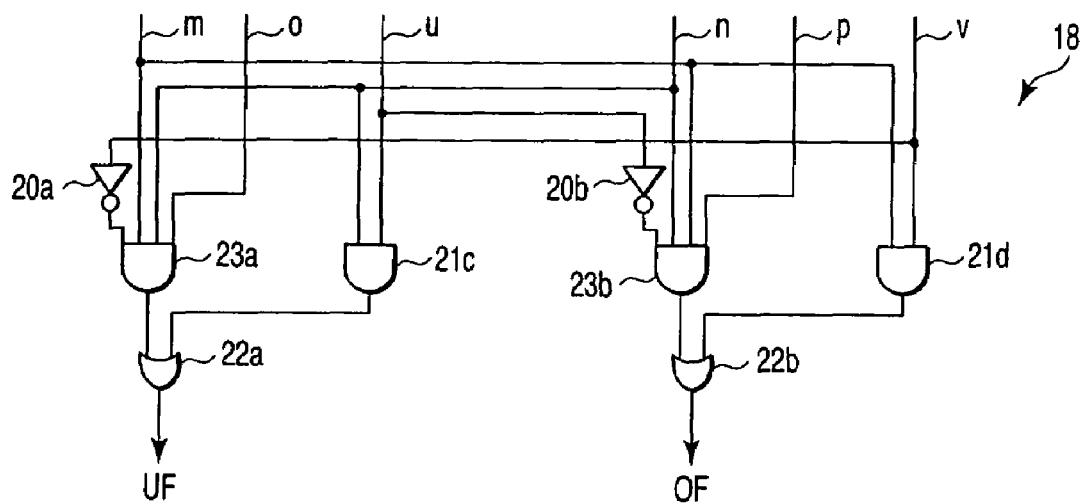
FIG. 20 is a circuit diagram showing a concrete configuration of a decode circuit for use in an elastic buffer according to a fourth embodiment of the present invention.

FIG. 20 shows another concrete configuration of the decode circuit 18 for use in the elastic buffer of FIG. 17. The point that the decode circuit 18 of FIG. 20 is different from that of FIG. 18 is that AND circuits 23*a* and 23*b* with four inputs are provided in place of the AND circuits 21*a* and 21*b* with three inputs. The configurations of the others are the same as those of FIG. 18. The AND circuits 21*a* and 21*b* with three inputs are replaced with the AND circuits 23*a* and 23*b* with four inputs. As a result, with respect to the inputs increased by one for each circuit, the lagging close signal m is input to the AND circuit 23*a*, and the leading close signal n is input to the AND circuit 23*b*.

The Table 5 is a truth table showing operations of the decode circuit of FIG. 20. The decode circuit outputs a signal e and a signal f, which are calculated by the following logical expressions on the basis of the output signals m and n of the OR circuits 9*a* and 9*b*, and the output signals o, p, u, and v of the storage circuits 10*a*, 10*b*, 19*a*, and 19*b*, respectively as an underflow signal and an overflow signal.

$$e = /v \cdot m \cdot n \cdot o + u \cdot n \quad (7)$$

$$f = /u \cdot m \cdot n \cdot p + v \cdot m \quad (8)$$

In the Table 5, relationships among the input signals m, n, o, and p, and the output signals e and f in a case of u=v=0 are completely the same as in the case of the Table 3. Namely, when an overflow or an underflow is detected for the first time from a state in which the pattern to be detected is at the ideal position, the decode circuit of FIG. 20 operates in completely the same way as the decode circuit of FIG. 16. Here, both of the underflow signal e and the overflow signal f are made to be 1 in a case of o=p=1 and m=n=1. This is, as a case which cannot be brought about rather than the meaning of warning, carried out so as to appropriately determine values of the e and f at that time for the purpose of simplifying the circuit. Further, the relationships among the input signals and the output signals in a case of not u=v=0 is completely the same as that in the case of the Table 4.

Figure 21:
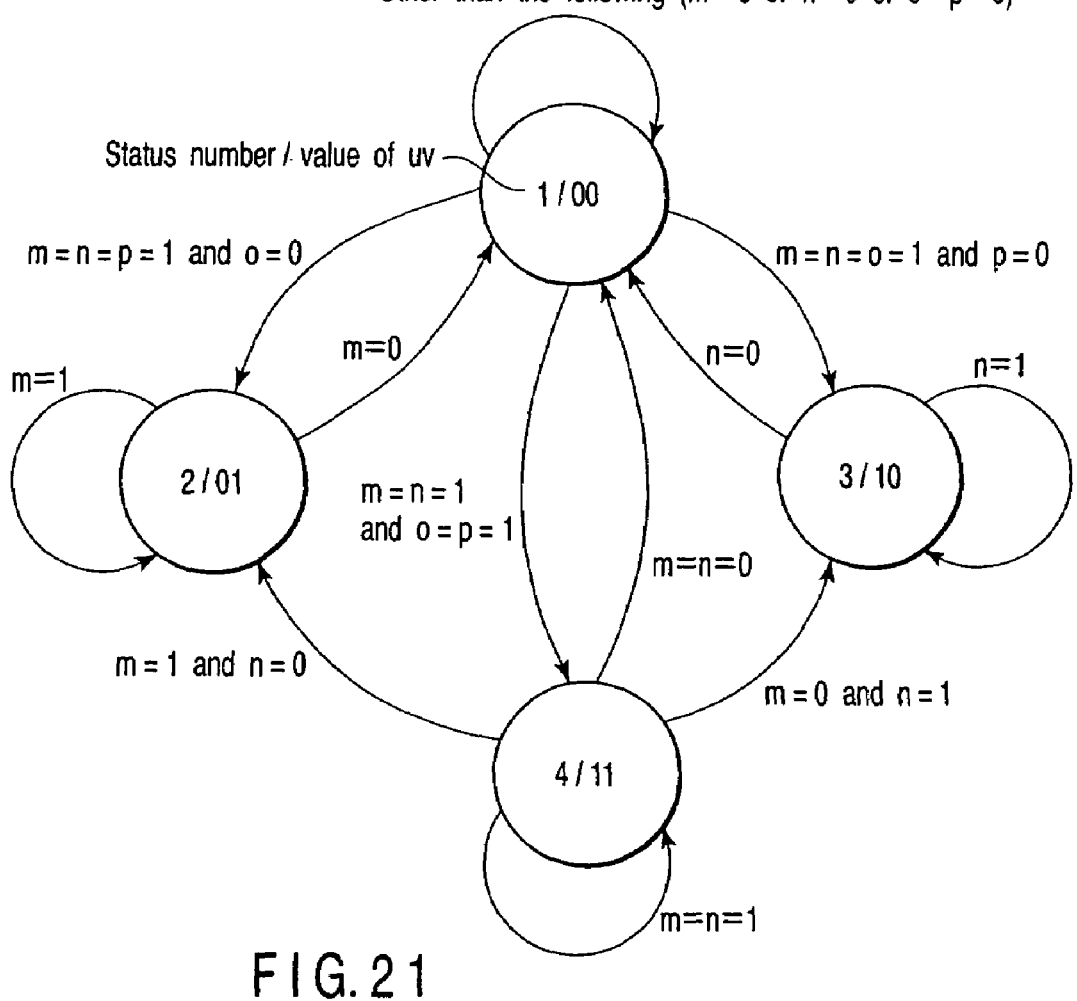
FIG. 21 is a state transition diagram of the elastic buffer according to the fourth embodiment.

FIG. 21 is a state transition diagram corresponding to the Table 5. Differences between FIG. 19 are a condition to make a transition from a status number 1 (uv=00) to status numbers 2 (uv=01)=and 3 (uv=10), and a condition to loop (make a transition to itself) at the status number 1 (uv=00).

TABLE 5

| Input signal | | | | | | Output signal | |
|---|---|---|---|---|---|---|---|
| u | v | m | n | o | p | e(UF) | f(OF) |
| 0 | 0 | 0 | 0 | — | — | 0 | 0 |
| 0 | 0 | 0 | 1 | — | — | 0 | 0 |
| 0 | 0 | 1 | 0 | — | — | 0 | 0 |
| 0 | 0 | 1 | 1 | 0 | 0 | 0 | 0 |
| 0 | 0 | 1 | 1 | 0 | 1 | 0 | 1 |
| 0 | 0 | 1 | 1 | 1 | 0 | 1 | 0 |
| 0 | 0 | 1 | 1 | 1 | 1 | 1 | 1 |
| 0 | 1 | 0 | 0 | — | — | 0 | 0 |
| 0 | 1 | 0 | 1 | — | — | 0 | 0 |
| 0 | 1 | 1 | 0 | — | — | 0 | 1 |
| 0 | 1 | 1 | 1 | — | — | 0 | 1 |
| 1 | 0 | 0 | 0 | — | — | 0 | 0 |
| 1 | 0 | 0 | 1 | — | — | 1 | 0 |
| 1 | 0 | 1 | 0 | — | — | 0 | 0 |
| 1 | 0 | 1 | 1 | — | — | 1 | 0 |
| 1 | 1 | 0 | 0 | — | — | 0 | 0 |
| 1 | 1 | 0 | 1 | — | — | 1 | 0 |
| 1 | 1 | 1 | 0 | — | — | 0 | 1 |
| 1 | 1 | 1 | 1 | — | — | 1 | 1 |

The decode circuit of FIG. 20 carries out the following operations in accordance with the truth table and the state transition diagram. When an overflow or an underflow is detected for the first time from a state in which the pattern to be detected is at the ideal position (u=v=0), the decode circuit operates in completely the same way as in the case of using the decode circuit of FIG. 16. Further, in a state in which the fact that an overflow or an underflow has been brought about has been stored as a state signal (u=1 or v=1), the decode circuit operates in completely the same way as in the case of using the decode circuit of FIG. 18.

Provided that the decode circuit of FIG. 20 is used, the bit width of the ideal position can be made to be 2 bits in the same way as in the second embodiment. However, it is in the same way that the width of the trap is required to have 1 bit or more. Further, because a condition to recover after detecting an overflow or an underflow is determined to be the same as in the third embodiment, there is no case where, as in the second embodiment, it cannot be distinguished whether an overflow has been brought about or an underflow has been brought about when an overflow or an underflow has been detected again after detecting it.

Moreover, even if the pattern to be detected slips through a trap due to the state being left as is after detecting an overflow or an underflow, during the bits whose values are 1 in the pattern to be detected 'x1x' are being overlapped onto the detection bits of a ring counter (6b or 6c) which is the same as that onto which the bits have been overlapped immediately after slipping-through, the detecting signal outputs directly before the slipping-through are continued to be output. Therefore, the fourth embodiment can be applied to a case where means for dissolving an overflow or underflow state is insufficient, or a case where there is a delay in coping therewith.

Fifth Embodiment

Figure 22:
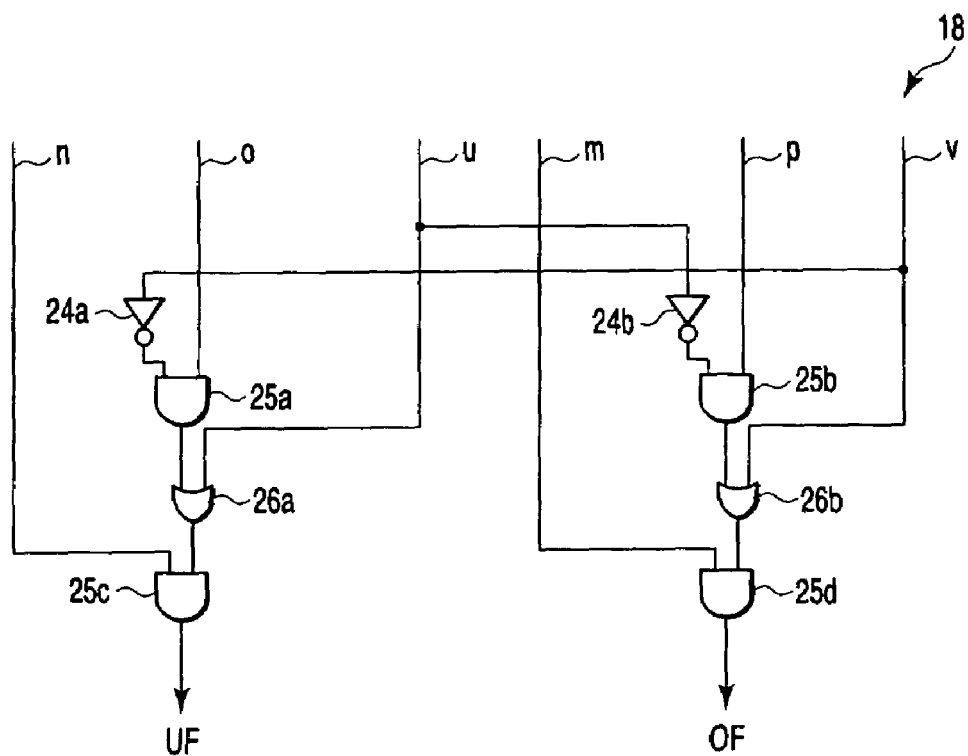
FIG. 22 is a circuit diagram showing a concrete configuration of a decode circuit for use in an elastic buffer according to a fifth embodiment of the present invention.

FIG. 22 shows another concrete configuration of the decode circuit 18 for use in the elastic buffer of FIG. 17. The decode circuit 18 is constituted of two inverters 24a and 24b, four AND circuits 25a to 25d, and two OR circuits 26a and 26b.

An output signal v of the storage circuit 19b is input to the inverter 24a, and the inverter 24a outputs an inverse signal /v. The output signal /v of the inverter 24a and the output signal o of the storage circuit 10a are input to the AND circuit 25a. The output signal of the AND circuit 25a and an output signal u of the storage circuit 19b are input to the OR circuit 26a. The output signal n of the OR circuit 9b and the output signal of the OR circuit 26a are input to the AND circuit 25c, and the AND circuit 25c outputs an underflow signal UF.

The output signal u of the storage circuit 19a is input to the inverter 24b, and the inverter 24b outputs an inverse signal /u. The output signal /u of the inverter 24b and the output signal p of the storage circuit 10b are input to the AND circuit 25b. The output signal of the AND circuit 25b and the output signal v of the storage circuit 19b are input to the OR circuit 26b. The output signal m of the OR circuit 9a and the output signal of the OR circuit 26b are input to the AND circuit 25d, and the AND circuit 25d outputs an overflow signal OF.

The decode circuit of FIG. 22 is logically equivalent to the decode circuit of FIG. 18. The operations thereof can be easily grasped on the basis of the truth table serving as the Table 4 and the state transition diagram of FIG. 19 in the same way as in the third embodiment. The decode circuit of FIG. 22 is an example in which an attempt is made to make the operations high-speed by modifying the decode circuit of FIG. 18. The m and n among the signals to be input to the decode circuit 18 are, as shown in FIG. 17, input respectively via the AND circuit groups 8a and 8b and the OR circuits 9a and 9b. In contrast thereto, the other signals o, p, u, and v are directly input from the storage circuits 10a, 10b, 19a, and 19b of FIG. 17. Therefore, among the signals m and n, and the other input signals, differences in the time from a variation to a settlement of the clock signal ck2 are generated.

In order to make the operations of the decode circuit 18 fast, it is effective to input the signals m and n at a stage which is as latter as possible in the decode circuit. The decode circuit of FIG. 22 is an example in which an attempt has been made to make the operations high-speed on the basis of such a principle.

Sixth Embodiment

Figure 23:
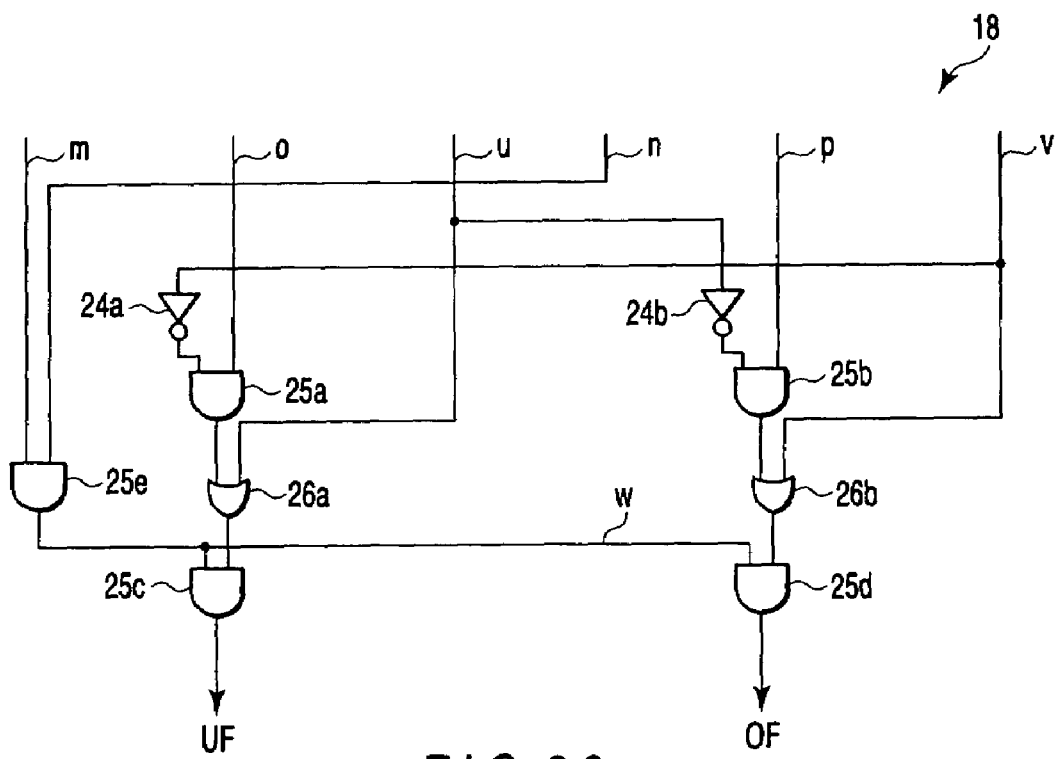
FIG. 23 is a circuit diagram showing a concrete configuration of a decode circuit for use in an elastic buffer according to a sixth embodiment of the present invention.

FIG. 23 shows yet another concrete configuration of the decode circuit 18 for use in the elastic buffer of FIG. 17. With respect to the decode circuit 18, an AND circuit 25e is newly added to the decode circuit of FIG. 22. The signals n and m are input to the AND circuit 25e. In the decode circuit of FIG. 22, both of the signals n and m respectively supplied to the AND circuits 25c and 25d are replaced with an output signal w of the newly added AND circuit 25e. In addition thereto, portions corresponding to those of FIG. 22 are denoted by the same reference numerals, and descriptions thereof will be omitted.

Table 6 is a truth table showing operations of the decode circuit shown in FIG. 23. The decode circuit outputs a signal e and a signal f, which are calculated by the following logical expressions on the basis of the output signals m and n of the OR circuits 9a and 9b, and the output signals o, p, u, and v of the storage circuits 10a, 10b, 19a, and 19b, respectively as an underflow signal and an overflow signal.

$$e = m \cdot n (/v \cdot o + u) \quad (9)$$

$$f = m \cdot n (/u \cdot p + v) \quad (10)$$

TABLE 6

| Input signal | | | | | | Output signal | |
|---|---|---|---|---|---|---|---|
| u | v | m | n | o | p | e(UF) | f(OF) |
| 0 | 0 | 0 | 0 | — | — | 0 | 0 |
| 0 | 0 | 0 | 1 | — | — | 0 | 0 |
| 0 | 0 | 1 | 0 | — | — | 0 | 0 |
| 0 | 0 | 1 | 1 | 0 | 0 | 0 | 0 |
| 0 | 0 | 1 | 1 | 0 | 1 | 0 | 1 |
| 0 | 0 | 1 | 1 | 1 | 0 | 1 | 0 |
| 0 | 0 | 1 | 1 | 1 | 1 | 1 | 1 |
| 0 | 1 | 0 | — | — | — | 0 | 0 |
| 0 | 1 | 1 | 0 | — | — | 0 | 0 |
| 0 | 1 | 1 | 1 | — | — | 0 | 1 |
| 1 | 0 | 0 | — | — | — | 0 | 0 |
| 1 | 0 | 1 | 0 | — | — | 0 | 0 |
| 1 | 0 | 1 | 1 | — | — | 1 | 0 |
| 1 | 1 | 0 | — | — | — | 0 | 0 |
| 1 | 1 | 1 | 0 | — | — | 0 | 0 |
| 1 | 1 | 1 | 1 | — | — | 1 | 1 |

In the Table 6, the relationships among the input signals m, n, o, and p in a case of u=v=0, and the output signals e and f are completely the same as those in the Table 5 or the Table 3. Namely, when an overflow or an underflow is detected for the first time from a state in which the pattern to be detected is at the ideal position, the decode circuit of FIG. 23 operates in completely the same way as the decode circuit of FIG. 20 or FIG. 16. However, the relationships among the input signals and the output signals in a case of not u=v=0 are different from those in the Table 5 or the Table 4. This difference means that m=n=1 must be established in order for one of the signals u and v to be maintained to be 1 (the following state is the same).

Figure 24:
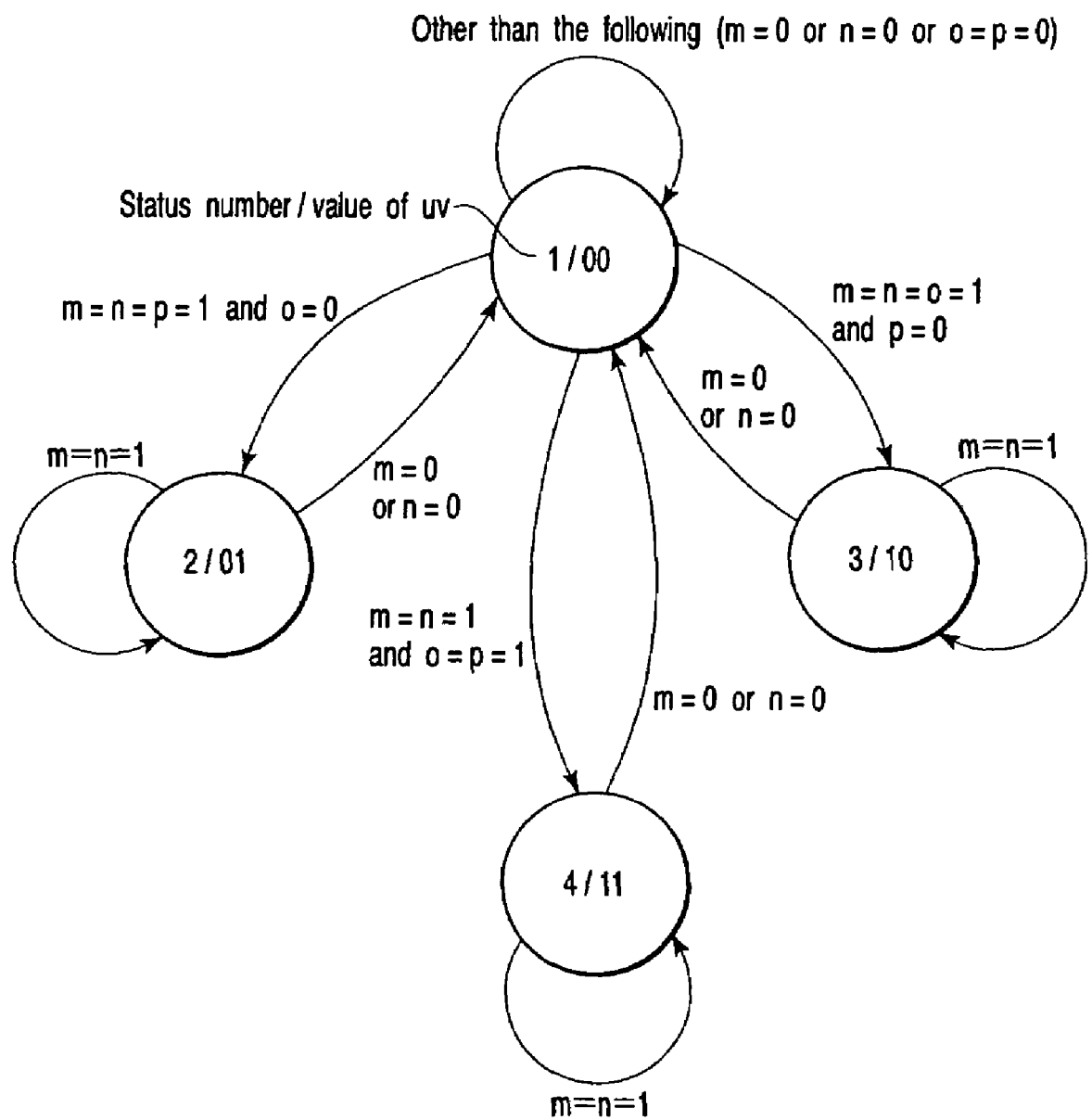
FIG. 24 is a state transition diagram of the elastic buffer according to the sixth embodiment.

FIG. 24 is a state transition diagram corresponding to the Table 6. Differences between that of FIG. 21 are in the point that a condition to return from the status numbers 2 to 4 (uv=01, 10, 11) to the status 1 (uv=00), and a transition from the status 4 (uv=11) to the statuses 2 and 3 is not carried out.

It is difficult to make an attempt to make the decode circuit in the fourth embodiment shown in FIG. 20 high-speed by the same method in FIG. 22. FIG. 23 is an example in which the truth table of the decode circuit in the fourth embodiment shown in FIG. 20 is changed, and the logical product (AND)

of the lagging close signal m and the leading close signal n is input to a logic gate closest to the output side of the decode circuit.

The AND circuits 25c and 25d in FIG. 23 are circuits with two inputs, and those are changed into the AND circuits with three inputs, and the AND circuit 25e is omitted, and the signals m and n may be input to both of the AND circuits 25c and 25d with three inputs. By modifying those in this way, an attempt can be made to make the circuit high-speed by the principle which is the same as that of FIG. 22. However, as understood from the truth table and the state transition diagram, slipping-through a trap by the pattern to be detected is not permitted even after detecting an overflow or an underflow. When the decode circuit of the sixth embodiment is used, it is necessary to dissolve an overflow or an underflow before the pattern to be detected slips through the trap. Even if it is insufficient to dissolve it, an overflow or an underflow can be detected unless the pattern to be detected passes over the trap. The trap is required to have a width of 1 bit or more. However, the bit width of the ideal position may be 2 bits.

Seventh Embodiment

Figure 25:
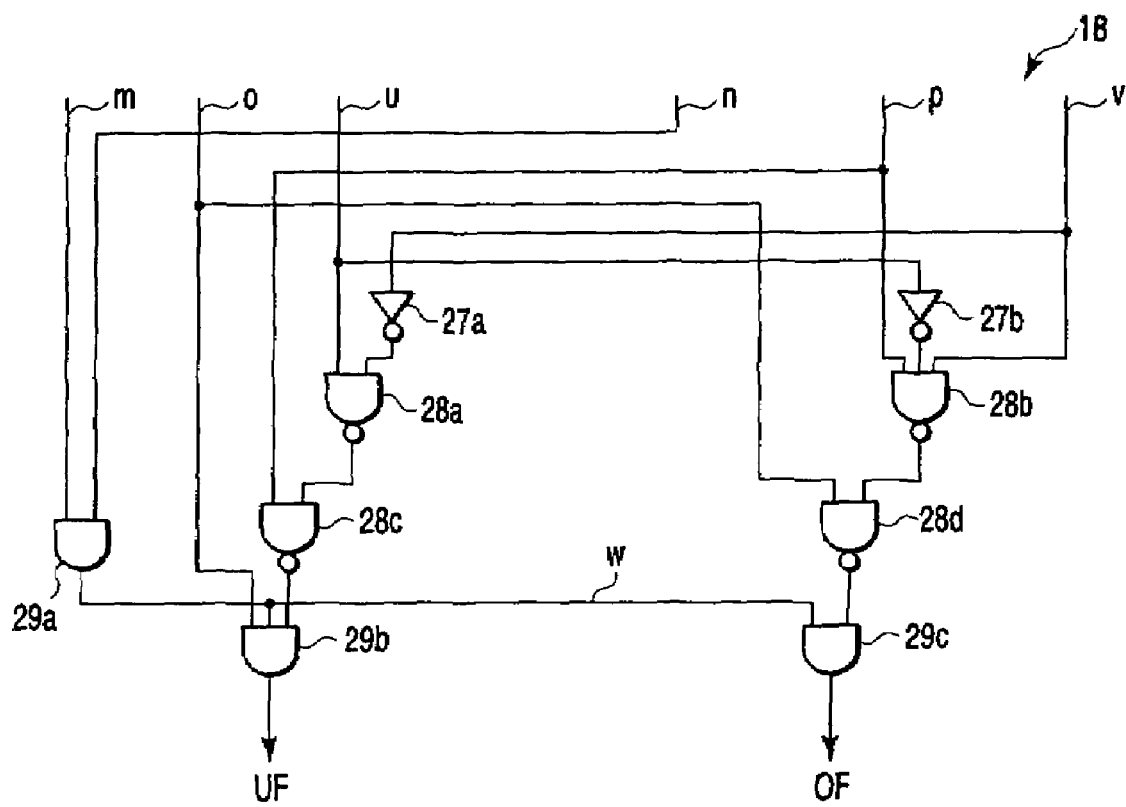
FIG. 25 is a circuit diagram showing a concrete configuration of a decode circuit for use in an elastic buffer according to a seventh embodiment of the present invention.

FIG. 25 shows even another concrete configuration of the decode circuit 18 for use in the elastic buffer of FIG. 17. The decode circuit 18 is composed of two inverters 27a and 27b, four NAND circuits 28a to 28d, and three AND circuits 29a to 29c.

The output signal v of the storage circuit 19b is input to the inverter 27a, and the inverter 27a outputs an inverse signal /v. The output signal /v of the inverter 27a and the output signal u of the storage circuit 10a are input to the NAND circuit 28a. An output signal of the NAND circuit 28a and the output signal p of the storage circuit 10b are input to the NAND circuit 28c. The output signals m and n of the OR circuits 9a and 9b are input to the AND circuit 29a. The output signal of the NAND circuit 28c, the output signal w of the AND circuit 29a, and the output signal o of the storage circuit 10a are input to the AND circuit 29b, and the AND circuit 29b outputs the underflow signal UF.

The output signal u of the storage circuit 19a is input to the inverter 27b, and the inverter 27b outputs an inverse signal /u. The output signal /u of the inverter 27b, the output signal p of the storage circuit 10b, and the output signal v of the storage circuit 19b are input to the NAND circuit 28b. The output signal of the NAND circuit 28b and the output signal o of the storage circuit 10a are input to the NAND circuit 28d. The output signal w of the AND circuit 29a and the output signal of the NAND circuit 28d are input to the AND circuit 29c, and the AND circuit 29c outputs the overflow signal OF.

The Table 7 is a truth table showing operations of the decode circuit shown in FIG. 25. The decode circuit outputs a signal e and a signal f, which are calculated by the following logical expressions on the basis of the output signals m and n of the OR circuits 9a and 9b, and the output signals o, p, u, and v of the storage circuits 10a, 10b, 19a, and 19b, respectively as an underflow signal UF and an overflow signal OF.

$$e = m \cdot n \cdot o \; [/p + u \cdot (/v)] \quad (11)$$

$$f = m \cdot n \; [/o + p \cdot (/u) \cdot v] \quad (12)$$

As in the above sixth embodiment, provided that slipping-through the trap by the pattern to be detected is not permitted even after an overflow or an underflow has been brought about, i.e., provided that the processing is carried out before the pattern to be detected slips through the trap after detecting an overflow or an underflow, the decode circuit can be composed of a standpoint differently from the previous one.

As in the second, fourth, and sixth embodiments, in order for one of the state signals u and v to be 1 by detecting an overflow or an underflow when the width of the trap is 1 bit or more, both of the lagging close signal m and the leading close signal n must be m=n=1. Therefore, in a case of u=1 or v=1, it is insured that both of the lagging close hysteresis o and the leading close hysteresis p are o=p=1. In the Table 7, only in a case of o=p=1, the state signals u and v are verified. This is that a function of detecting whether an overflow is brought about or an underflow is brought about in a state of o=p=1 after detecting an overflow or an underflow is added to the functions of the Table 3. However, in the Table 3, in a case of o=p=0 and m=n=1, e=f=0 is established. However, in the Table 7, this is detected as an overflow. Further, a combination by which e=f=1 is established is not provided. Because a detecting operation is carried out in the same way in both of the state of u=v=1 and the state of u=v=0, operations as usual are continued even if u=v=1 is established by a strong disturbance. The state of u=v=1 is immediately dissolved when the influence by disturbance is eliminated because there is no combination by which e=f=1 is established. Note that a state transition diagram corresponding to the Table 7 is omitted.

TABLE 7

| Input signal | | | | | | Output signal | |
|---|---|---|---|---|---|---|---|
| m | n | o | p | u | v | e(UF) | f(OF) |
| 0 | 0 | — | — | — | — | 0 | 0 |
| 0 | 1 | — | — | — | — | 0 | 0 |
| 1 | 0 | — | — | — | — | 0 | 0 |
| 1 | 1 | 0 | 0 | — | — | 0 | 1 |
| 1 | 1 | 0 | 1 | — | — | 0 | 1 |
| 1 | 1 | 1 | 0 | — | — | 1 | 0 |
| 1 | 1 | 1 | 1 | 0 | 0 | 0 | 0 |
| 1 | 1 | 1 | 1 | 0 | 1 | 0 | 1 |
| 1 | 1 | 1 | 1 | 1 | 0 | 1 | 0 |
| 1 | 1 | 1 | 1 | 1 | 1 | 0 | 0 |

The feature of the seventh embodiment is that, as shown in the Table 7, the truth table is on a small scale. The configuration of the decode circuit is made complicated to some extent as shown in FIG. 25. However, because the logical product w of the m and n is input to the AND circuits 29b and 29c which are logic gates positioned at the final stage of the decode circuit, the decode circuit can be operated at high speed due to the reason which is the same as those in the fifth and sixth embodiments. Further, the seventh embodiment may be modified such that AND circuits with three inputs are respectively provided in place of the AND circuits 29b and 29c with two inputs, and moreover, the AND circuit 29a is omitted, and the signals m and n are directly input to the AND circuits with three inputs. The trap is required to have a width of 1 bit or more, and when an overflow or an underflow is detected, it is necessary to carry out the processing of an overflow or an underflow during the pattern to be detected is being overlapped onto the trap. The bit width of the ideal position may be 2 bits.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An elastic buffer for receiving to store data from a first circuit which operates to synchronize a first clock signal, and reading the data out to a second circuit which operates to synchronize a second clock signal whose phase is different from that of the first clock signal, the elastic buffer comprising: a fist storage circuit connected to the first and second circuits; and a detection circuit which receives the first and second clock signals, and detects an overflow state in which unread data has been broken or is going to be broken, and an underflow state in which already-read data or invalid data has been read or is going to be read, wherein the detection circuit has: a first ring counter in which first initial value data composed of a plurality of first bits is set, the first ring counter receiving the first clock signal, and circulating the first initial value data to synchronize the first clock signal; a second ring counter in which second initial value data composed of a plurality of second bits is set, the second ring counter receiving the second clock signal, and circulating the second initial value data to synchronize the second clock signal; a third ring counter in which third initial value data composed of a plurality of third bits is set, the third ring counter receiving the second clock signal, and circulating the third initial value data to synchronize the second clock signal; a second storage circuit which receives an output of the first ring counter and the second clock signal, and fetches and holds the output of the first ring counter to synchronize the second clock signal; a first AND circuit group which has first and second inputs, and comprises a plurality of first AND circuits which receives fourth bits respectively corresponding to an output of the second ring counter and an output of the second storage circuit at the first and second inputs; a second AND circuit group which has third and fourth inputs, and comprises a plurality of second AND circuits which receives fifth bits respectively corresponding to an output of the third ring counter and an output of the second storage circuit at the third and fourth inputs; a first OR circuit which has a plurality of first OR inputs, and receives outputs of the first AND circuit group at said plurality of first OR inputs; a second OR circuit which has a plurality of second OR inputs, and receives outputs of the second AND circuit group at said plurality of second OR inputs; a third storage circuit which receives and stores an output of the first OR circuit; a fourth storage circuit which receives and stores an output of the second OR circuit; and a decode circuit which receives outputs of the first and second OR circuits and outputs of the third and fourth storage circuits, and decodes these outputs to output an overflow signal and an underflow signal.

2. The elastic buffer according to claim 1, further comprising:
a first counter which receives the first clock signal, and in which contents are changed to synchronize the first clock signal, and the contents are output as a write address to the first storage circuit; and
a second counter which receives the second clock signal, and in which contents are changed to synchronize the second clock signal, and the contents are output as a read address to the first storage circuit.

3. The elastic buffer according to claim 2, wherein the first storage circuit writes data input from the first circuit into a storage region indicated by the write address, and reads out contents of the storage region specified by the read address as output data to the second circuit.

4. The elastic buffer according to claim 1, wherein the first initial value data has same values at regions of adjacent 2 bits or more, and has values different from those at regions other than the regions of 2 bits or more.

5. The elastic buffer according to claim 1, wherein each of the second and third initial value data has same values at regions of adjacent 3 bits or more, and has values different from those at regions other than the regions of 3 bits or more.

6. The elastic buffer according to claim 5, wherein values of at least one bit in the regions of 3 bits or more respectively in the second initial value data and the third initial value data are equal to each other.

7. The elastic buffer according to claim 1, wherein the first, second, and third ring counters each have: a plurality of flip-flop circuits which respectively receive the first or second clock signal as a synchronous signal; and a plurality of selectors provided at the preceding stages of said plurality of flip-flop circuits, each of the selectors having first and second inputs and an output, receiving data of corresponding bits in the first, second and third initial value data of a plurality of sixth bits as the respective first inputs, and receiving outputs of said plurality of flip-flop circuits provided at the preceding stages as the respective second inputs, the output being input to said plurality of flip-flop circuits provided at the subsequent stages.

8. The elastic buffer according to claim 1, wherein the decode circuit includes: a third AND circuit which receives an output of the second OR circuit and an output of the third storage circuit, and outputs the underflow signal; and a fourth AND circuit which receives an output of the first OR circuit and an output of the fourth storage circuit, and outputs the overflow signal.

9. The elastic buffer according to claim 1, wherein the decode circuit includes: a third AND circuit which receives outputs of the first and second OR circuits and an output of the third storage circuit, and outputs the underflow signal; and a fourth AND circuit which receives outputs of the first and second OR circuits and output of the fourth storage circuit, and outputs the overflow signal.

10. An elastic buffer for receiving to store data from a first circuit operating to synchronize a first clock signal, and reading the data out to a second circuit which operates to synchronize a second clock signal whose phase is different from that of the first clock signal, the elastic buffer comprising: a fist storage circuit connected to the first and second circuits; and a detection circuit which receives the first and second clock signals, and detects an overflow state in which unread data has been broken or is going to be broken, and an underflow state in which already-read data or invalid data has been read or is going to be read, wherein the detection circuit has: a first ring counter in which first initial value data composed of a plurality of first bits is set, the first ring counter receiving the first clock signal, and circulating the first initial value data to synchronize the first clock signal; a second ring counter in which second initial value data composed of a plurality of second bits is set, the second ring counter receiving the second clock signal, and circulating the second initial value data to synchronize the second clock signal; a third ring counter in which third initial value data composed of a plurality of third bits is set, the third ring counter receiving the second clock signal, and circulating the third initial value data to synchronize the second clock signal; a second storage circuit which receives an output of the first ring counter and the second clock signal, and fetches and holds the output of the first ring counter to synchronize the second clock signal; a first AND circuit group which has first and second inputs, and comprises a plurality of first AND circuits which receive fourth bits respectively corresponding to an output of the second ring counter and an output of the second storage circuit at the first and second inputs; a second AND circuit group which has third and fourth inputs, and comprises a plurality of second AND circuits which receive fifth bits respectively corresponding to an output of the third ring counter and an output of the second storage circuit at the third and fourth inputs; a first OR circuit which has a plurality of first OR inputs, and receives outputs of the first AND circuit group at said plurality of first OR inputs; a second OR circuit which has a plurality of second OR inputs, and receives outputs of the second AND circuit group at said plurality of second OR inputs; a third storage circuit which receives and stores an output of the first OR circuit; a fourth storage circuit which receives and stores an output of the second OR circuit; a fifth storage circuit which receives the underflow signal and the second clock signal, stores the underflow signal to synchronize the second clock signal; a sixth storage circuit which receives the overflow signal and the second clock signal, stores the overflow signal to synchronize the second clock signal; and a decode circuit which receives outputs of the first and second OR circuits, outputs of the third, fourth, fifth and sixth storage circuits, and decodes those to output the overflow signal and the underflow signal.

11. The elastic buffer according to claim 10, further comprising:
a first counter which receives the first clock signal, and in which contents are changed so as to synchronize the first clock signal, and the contents are output as a write address to the first storage circuit; and
a second counter which receives the second clock signal, and in which contents are changed so as to synchronize the second clock signal, and the contents are output as a read address to the first storage circuit.

12. The elastic buffer according to claim 11, wherein the first storage circuit writes data input from the first circuit into a storage region specified by the write address, and reads out contents of the storage region specified by the read address as output data to the second circuit.

13. The elastic buffer according to claim 10, wherein the first initial value data has same values at regions of adjacent 2 bits or more, and has values different from those at regions other than the regions of 2 bits or more.

14. The elastic buffer according to claim 10, wherein each of the second and third initial value data has same values at regions of adjacent 3 bits or more, and has values different from those at regions other than the regions of 3 bits or more.

15. The elastic buffer according to claim 14, wherein values of at least one bit in the regions of 3 bits or more respectively in the second initial value data and the third initial value data are equal to each other.

16. The elastic buffer according to claim 10, wherein the first, second, and third ring counters each have: a plurality of flip-flop circuits which respectively receive the first or second clock signal as a synchronous signal; and a plurality of selectors provided at the preceding stages of said plurality of flip-flop circuits, each of the selectors having first and second inputs and an output, receiving data of corresponding bits in the initial value data of a plurality of sixth bits at the respective first inputs, and receiving outputs of said plurality of flip-flop circuits provided at the preceding stages at the respective second inputs, the output being input to said plurality of flip-flop circuits provided at the subsequent stages.

17. The elastic buffer according to claim 10, wherein the decode circuit includes: a third AND circuit which receives an output of the third storage circuit, an inverse output of the sixth storage circuit, and an output of the second OR circuit; a fourth AND circuit which receives an output of the second OR circuit and an output of the fifth storage circuit; a third OR circuit which receives outputs of the third and fourth AND circuits, and outputs the underflow signal; a fifth AND circuit which receives an output of the fourth storage circuit, an inverse output of the fifth storage circuit, and an output of the first OR circuit; a sixth AND circuit which receives an output of the first OR circuit and an output of the sixth storage circuit; and a fourth OR circuit which receives outputs of the fifth and sixth AND circuits, and outputs the overflow signal.

18. The elastic buffer according to claim 10, wherein the decode circuit includes: a third AND circuit which receives an output of the third storage circuit, an inverse output of the sixth storage circuit, and outputs of the first and second OR circuits; a fourth AND circuit which receives an output of the second OR circuit and an output of the fifth storage circuit; a third OR circuit which receives outputs of the third and fourth AND circuits, and outputs the underflow signal; a fifth AND circuit which receives an output of the fourth storage circuit, an inverse output of the fifth storage circuit, and outputs of the first and second OR circuits; a sixth AND circuit which receives an output of the first OR circuit and an output of the sixth storage circuit; and a fourth OR circuit which receives outputs of the fifth and sixth AND circuits, and outputs the overflow signal.

19. The elastic buffer according to claim 10, wherein the decode circuit includes: a third AND circuit which receives an output of the third storage circuit and an inverse output of the sixth storage circuit; a third OR circuit which receives an output of the third AND circuit and an output of the fifth storage circuit; a fourth AND circuit which receives outputs of the first and second OR circuits; a fifth AND circuit which receives an output of the fourth AND circuit and an output of the third OR circuit, and outputs the underflow signal; a sixth AND circuit which receives an output of the fourth storage circuit and an inverse output of the fifth storage circuit; a fourth OR circuit which receives an output of the sixth AND circuit and an output of the sixth storage circuit; and a seventh AND circuit which receives an output of the fourth AND circuit and an output of the fourth OR circuit, and outputs the overflow signal.

20. The elastic buffer according to claim 10, wherein the decode circuit includes: a first NAND circuit which receives an output of the fifth storage circuit and an inverse output of the sixth storage circuit; a second NAND circuit which receives an output of the first NAND circuit and an output of the fourth storage circuit; a third AND circuit which receives outputs of the first and second OR circuits; a fourth AND circuit which receives an output of the second NAND circuit, an output of the third AND circuit, and an output of the third storage circuit, and outputs the underflow signal; a third NAND circuit which receives an output of the fourth storage circuit, an inverse output of the fifth storage circuit, and an output of the sixth storage circuit; a fourth NAND circuit which receives an output of the third NAND circuit and an output of the third storage circuit; and a fifth AND circuit which receives an output of the third AND circuit and an output of the fourth NAND circuit, and outputs the overflow signal.

* * * * *